US010606318B1

(12) United States Patent
Lin

(10) Patent No.: US 10,606,318 B1
(45) Date of Patent: Mar. 31, 2020

(54) HINGE MECHANISM AND MODE DETECTOR FOR FOLDABLE DISPLAY DEVICE

(71) Applicant: GOOGLE LLC, Mountain View, CA (US)

(72) Inventor: Wen Shian Lin, New Taipei (TW)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/420,958

(22) Filed: May 23, 2019

(51) Int. Cl.
G06F 1/16 (2006.01)
E05D 7/00 (2006.01)
E05D 11/00 (2006.01)
G09G 5/00 (2006.01)

(52) U.S. Cl.
CPC .............. *G06F 1/1652* (2013.01); *E05D 7/00* (2013.01); *E05D 11/00* (2013.01); *G06F 1/1616* (2013.01); *G06F 1/1641* (2013.01); *G06F 1/1681* (2013.01); *G09G 5/003* (2013.01); *E05Y 2900/606* (2013.01); *G06F 2200/1637* (2013.01); *G09G 2380/02* (2013.01)

(58) Field of Classification Search
CPC combination set(s) only.
See application file for complete search history.

(56) References Cited

U.S. PATENT DOCUMENTS

| 5,608,793 | A | 3/1997 | Uriya |
| 7,714,801 | B2 * | 5/2010 | Kimmel ................ G06F 1/1616 345/1.3 |
| 8,264,823 | B2 | 9/2012 | Kim et al. |
| 8,434,198 | B2 | 5/2013 | Nagami et al. |
| 9,489,078 | B2 * | 11/2016 | Seo ........................ G06F 1/1641 |
| 9,489,079 | B2 * | 11/2016 | Seo ........................ G06F 1/1641 |
| 9,489,080 | B2 * | 11/2016 | Seo ........................ G06F 1/1641 |
| 9,684,342 | B2 | 6/2017 | Kim et al. |
| 9,891,662 | B2 * | 2/2018 | Cho ....................... G06F 1/1616 |
| 9,934,755 | B2 * | 4/2018 | Roh .................... G02B 27/0101 |
| 10,001,810 | B2 * | 6/2018 | Yoo ....................... G06F 1/1626 |
| 10,063,677 | B2 * | 8/2018 | Cavallaro ........... H04M 1/0268 |
| 10,263,982 | B2 * | 4/2019 | Kim .................... H04L 63/0861 |
| 10,306,783 | B2 * | 5/2019 | Seo ..................... H04M 1/0216 |

(Continued)

*Primary Examiner* — Lisa Lea-Edmonds
(74) *Attorney, Agent, or Firm* — Brake Hughes Bellermann LLP

(57) ABSTRACT

In a general aspect, a foldable electronic device may include a processor, a memory, a first housing including a first hinge portion, a second housing, a flexible display disposed on the first housing and the second housing, a hinge assembly including a second hinge portion rotatably coupled to the first hinge portion of the first housing, wherein the hinge assembly is configured for providing relative rotation of the first housing with respect to the second housing, and a mode detector assembly configured to detect configurations of the electronic device and configured to generate a signal indicating a change of mode of operation of the display. The mode detector assembly may include at least a flexible connection member and a spring member. The spring member may be disposed in the first hinge portion of the first housing or in the second hinge portion of the hinge assembly or in the first hinge portion of the first housing and in the second hinge portion of the hinge assembly, and a portion of the flexible connection member may be disposed in the first hinge portion of the first housing.

20 Claims, 21 Drawing Sheets

(56) References Cited

U.S. PATENT DOCUMENTS

| | | | |
|---|---|---|---|
| 2015/0338888 A1* | 11/2015 | Kim | G06F 1/1677 |
| | | | 345/156 |
| 2015/0378557 A1* | 12/2015 | Jeong | G06F 3/0488 |
| | | | 715/835 |
| 2016/0034047 A1 | 2/2016 | Lee et al. | |
| 2017/0038641 A1* | 2/2017 | Yamazaki | G02F 1/133555 |
| 2017/0052698 A1* | 2/2017 | Seo | G06F 1/1641 |
| 2017/0185289 A1* | 6/2017 | Kim | G06F 1/1641 |
| 2017/0206049 A1* | 7/2017 | Choi | G06F 1/1618 |
| 2017/0264888 A1* | 9/2017 | Valentine | H04N 13/31 |
| 2018/0324964 A1* | 11/2018 | Yoo | G06F 1/1616 |
| 2019/0012000 A1* | 1/2019 | Cavallaro | G06F 3/0346 |
| 2019/0166703 A1* | 5/2019 | Kim | H05K 5/0017 |
| 2019/0207933 A1* | 7/2019 | Kim | G06F 1/1616 |
| 2019/0227600 A1* | 7/2019 | Hirakata | G06F 1/1652 |
| 2019/0245955 A1* | 8/2019 | Lee | G06F 1/1677 |
| 2019/0258295 A1* | 8/2019 | Fujimoto | G06F 1/1618 |
| 2019/0258301 A1* | 8/2019 | Feliconio Pereira | |
| | | | G06F 3/04883 |
| 2019/0259351 A1* | 8/2019 | Yoon | G06F 1/1652 |
| 2019/0265756 A1* | 8/2019 | Jones | G06F 1/1626 |

\* cited by examiner

CLOSED CONFIGURATION

OPEN CONFIGURATION

HINGE MECHANISM AND MODE DETECTOR FOR FOLDABLE DISPLAY DEVICE

TECHNICAL FIELD

This disclosure relates generally to display devices, and, more particularly, to display devices that include a hinge mechanism and a mode detector to detect modes of the display device.

BACKGROUND

Display devices (e.g., cellular phones, portable computing devices, etc.) including a flexible display can be folded (e.g., bent, collapsed) to provide various configurations (e.g., fully-closed, fully-open, half-opened, etc.) of the display device. Based on the configuration, the display device may operate in different modes.

SUMMARY

In a general aspect, a foldable electronic device may include a processor, a memory, a first housing including a first hinge portion, a second housing, a flexible display disposed on the first housing and the second housing, a hinge assembly including a second hinge portion rotatably coupled to the first hinge portion of the first housing, wherein the hinge assembly is configured for providing relative rotation of the first housing with respect to the second housing, and a mode detector assembly configured to detect configurations of the electronic device and configured to generate a signal indicating a change of mode of operation of the display. The mode detector assembly may include at least a flexible connection member and a spring member. The spring member may be disposed in the first hinge portion of the first housing or in the second hinge portion of the hinge assembly or in the first hinge portion of the first housing and in the second hinge portion of the hinge assembly, and a portion of the flexible connection member may be disposed in the first hinge portion of the first housing.

In another general aspect, a foldable electronic device may include a processor, a memory, a first housing including a first hinge portion, a second housing, a flexible display disposed on the first housing and the second housing, a hinge assembly configured to provide relative rotation of the first housing and the second housing, the hinge assembly including a second hinge portion rotatably coupled to the first hinge portion of the first housing, and a mode detector assembly configured to detect configurations of the electronic device, the mode detector assembly including at least a flexible connection member and a spring member. The flexible connection member may include a first contact and a second contact, wherein, in a first rotational position of the electronic device, the spring member contacts a first contact disposed at a first location of the flexible connection member, and in a second rotational position of the electronic device, the spring member contacts a second contact disposed at a second location of the flexible connection member, the second location being at a different location than the first location.

In another general aspect, a foldable electronic device may include a processor, a memory, a first housing including a first hinge portion, a second housing, a flexible display disposed on the first housing and the second housing, a hinge assembly configured to provide relative rotation of the first housing and the second housing, the hinge assembly including a second hinge portion rotatably coupled to the first hinge portion of the first housing, and a mode detector assembly configured to detect configurations of the electronic device, the mode detector assembly including at least a mode detector, a flexible connection member, and a spring member, the mode detector including a needle portion, wherein, in a first rotational position of the electronic device, the needle portion is configured to engage a first notch disposed at a first location of a hinge module, and in a second rotational position of the electronic device, the needle portion is configured to engage a second notch disposed at a second location of the hinge module, the second notch being at a different location than the first notch.

DETAILED DESCRIPTION

Figure 1A:
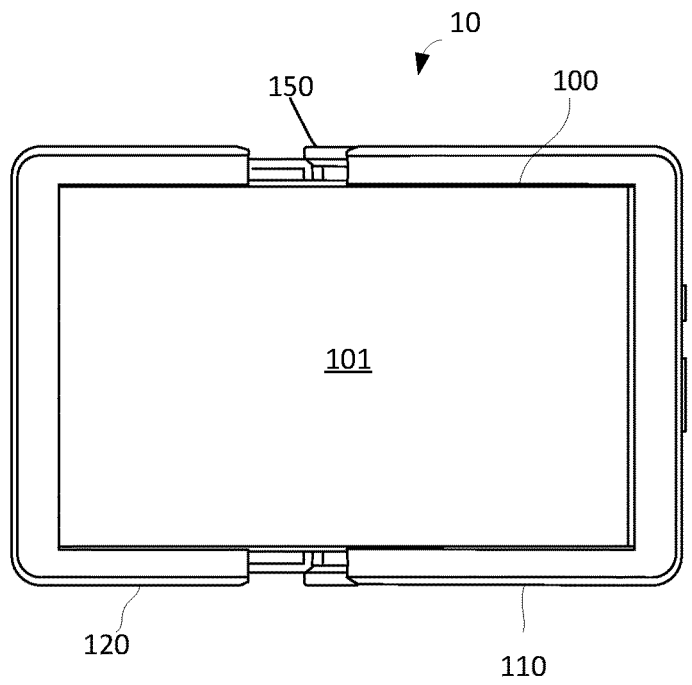
FIGS. 1A through 1C illustrate schematic views of an exemplary display device according to an example embodiment.

Display devices (e.g., organic light-emitting diode (OLED) displays) may include a flexible display coupled to a first housing member and a second housing member, which may fold or bend in a rotating manner about a hinge assembly. In some instances, the flexible display can be bent or folded such that two sides of the flexible display can face each other (e.g., closed mode), can be bent or folded such that two sides of the flexible display do not face each other (e.g., open mode), or can be bent or folded such that the two sides of the flexible display can be facing each other or oriented away from each other at an angle (e.g., tent mode). In each of these exemplary configurations, a mode detector can detect a position of the flexible display and determine the mode of operation. The mode detector can send information to a processor in an electronic device that can evaluate a signal(s) from the mode switch detector. The evaluation of the signals from the mode switch detector can provide the processor with information that can be used to determine a spatial relationship between the first housing member and the second housing member. For example, the processor can use the signals from the mode detector to indicate a relative position of the first and second housing members and, in response, change an operating state of the electronic device accordingly. For example, when the signals indicate that the first and second housing members are facing each other, i.e., fully closed (in the closed mode), then the processor can preclude the display from presenting visual content or turn off the display. When the mode detector detects the first and second housing members are not facing each other, i.e., fully opened (in the open mode), then the processor can send information to the processor to display the visual content on the entire display. When the mode detector detects the first and second housing members are facing each other at an angle (e.g., approximately 45°~135°) (in the tent mode), then the processor can use this information to determine that only a portion of the display is viewable (that portion of the display can correspond to the portion with a larger display area). In this situation, the processor can instruct the display to present visual content at only the viewable portion of the display.

In some implementations, the mode detector can be disposed in the hinge assembly that couples the first housing member to the second housing member. In this regard, the mode detector can cooperatively interact with a hinge in the hinge assembly and detect a relative position of the hinge. At this location, the mode detector can simultaneously receive and send information to the processor to indicate the relative position of the first and second housing members and determine the appropriate mode operation. This provides a faster processing speed and/or saves battery life consumed by the display. In addition, no additional parts and/or components (e.g., switches, sensors, etc.) are required besides the mode detector, which reduces cost and manufacturing time. Furthermore, the mode detector can be retrofitted into the hinge assembly that is presently installed.

Figure 1B:
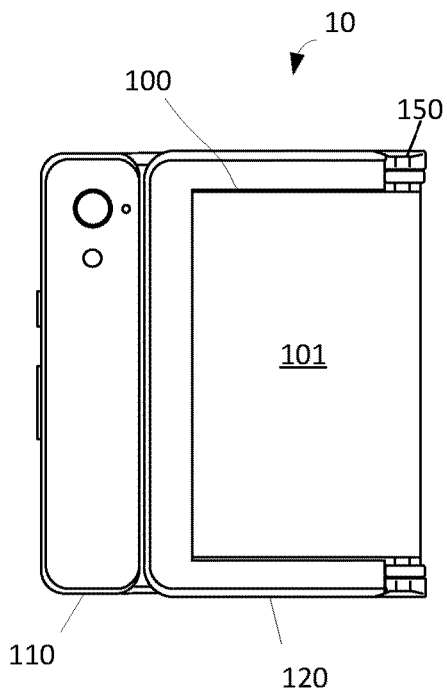
Figure 1C:
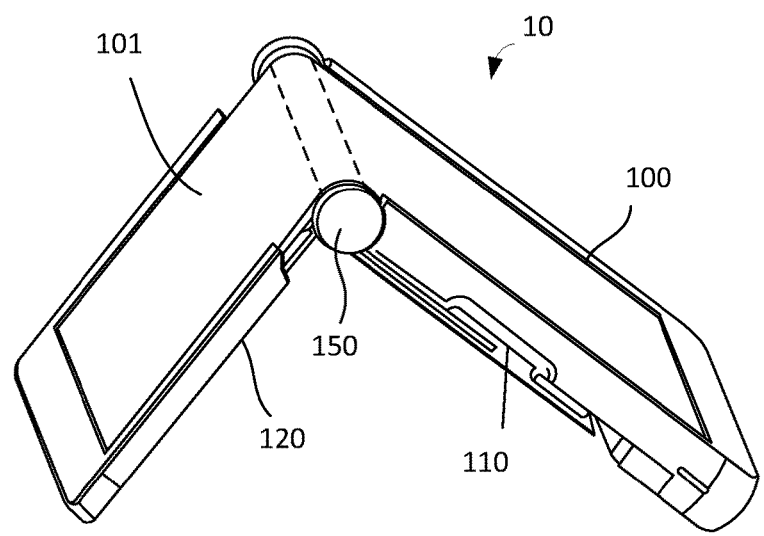

FIGS. 1A through 1C illustrate schematic views of an exemplary display device 10 according to an example embodiment. FIG. 1A illustrates the display device 10 in a fully open position (e.g., in an open mode or configuration), FIG. 1B illustrates the display device 10 in a fully closed or folded position (e.g., in a closed mode or configuration), and FIG. 1C illustrates the display device 10 in an angled position (e.g., in a tent mode or configuration). The display device 10 may be employed in a computing device such as a smart phone, a laptop computer, a tablet computer, a netbook computer, a mobile telephone, a media player, or other handheld or portable electronic device, such as a wrist-watch device. Other configurations may be used for display device 10 if desired. The example of FIG. 1A through 1C are merely illustrative.

Figure 2A:
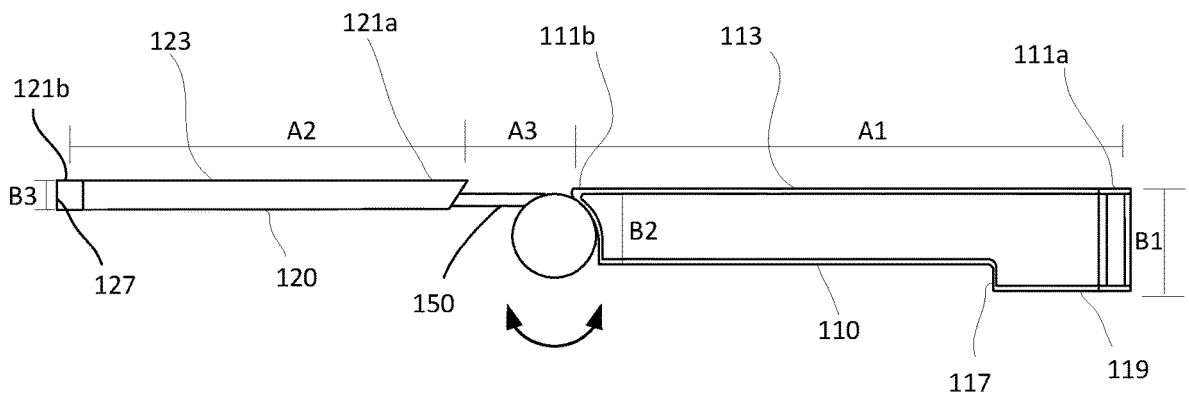
FIGS. 2A through 2C are side views of the exemplary display device shown in FIGS. 1A through 1C, respectively, according to an example embodiment.

The display device 10 may include a flexible display 100 disposed on a first housing 110 and a second housing 120. In this regard, the flexible display 100 can be coupled or attached to a surface 113 (as shown in FIG. 2A) of the first housing 110 and a surface 123 (as shown in FIG. 2A) of the second housing 120. In some implementations, the flexible display 100 can be coupled or attached to a portion of the first housing 110 and the second housing 120 by adhesive. For example, the adhesive may be a pressure sensitive adhesive, a foam adhesive, or other suitable adhesive.

The flexible display 100 may include an active area 101 (e.g., display area), in which an array of pixels (not shown) are formed. Other additional components for generating a variety of signals for operating the pixels in the display area may be included, such as, for example, a display driver integrated circuit, an inverter circuit, a multiplexer, an electro-static discharge (ESD) circuit, a power supply unit, and/or the like. In some implementations, the flexible display 100 may also include components associated with functionalities other than for operating the pixels of the flexible display 100. For example, the flexible display 100 may include components for providing a touch sensing functionality, a user authentication functionality (e.g., finger print scan), a multi-level pressure sensing functionality, a tactile feedback functionality and/or various other functionalities for the electronic device employing the flexible display 100. As illustrated in the exemplary embodiment shown herein, the flexible display 100 may be rectangular shaped. Other shapes may be employed, not limited to the exemplary embodiment described herein.

In some implementations, the first housing 110 and the second housing 120 may be made from a metal material (e.g., stainless steel, aluminum or aluminum alloy, etc.). In other implementations, the first housing 110 and the second housing 120 may made from, for example, plastic, glass, ceramics, rubber, and/or other suitable materials, or combination of materials. In some implementations, the first housing 110 and the second housing 120 may be formed from the same material. In some implementations, the first housing 110 and the second housing 120 may be formed from different materials. In some implementations, the first housing 110 and the second housing 120 may be formed by injection molding or formed using multiple structures.

Figure 2B:
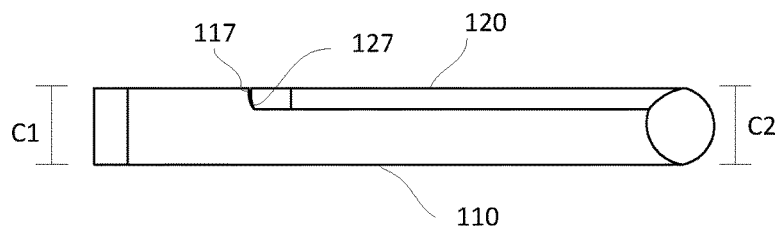
Figure 2C:
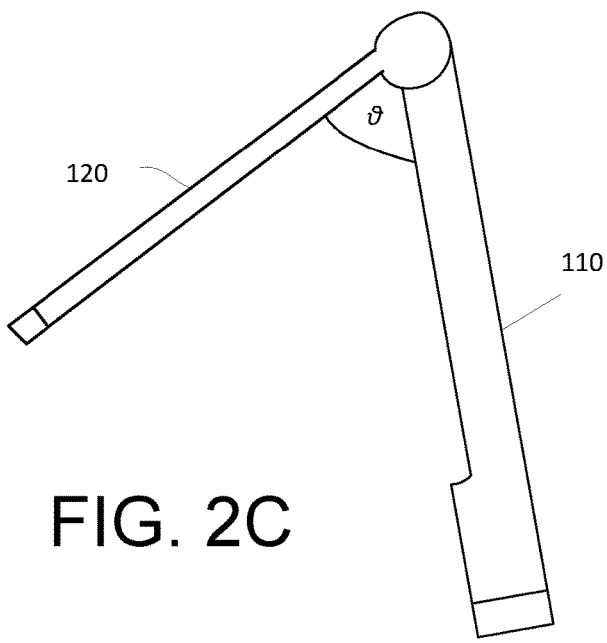

FIGS. 2A through 2C illustrate side views of the exemplary display device 10 according to an example embodiment. More specifically, FIG. 2A is a side view of FIG. 1A in the open configuration; FIG. 2B is a side view of FIG. 1B in the closed configuration; and FIG. 2C is a side view of FIG. 1C in the tent configuration.

The first housing 110 may include a first end portion 111a and a second end portion 111b. Length A1 extends between the first end portion 111a and the second end portion 111b. The second housing 120 may include a first end portion 121a and a second end portion 121b. Length A2 extends between the first end portion 121a and the second end portion 121b. In an exemplary embodiment shown herein, lengths A1 and A2 can be different. For example, length A1 of the first housing can be larger than length A2 of the second housing. This permits the second housing 120 to be encased (e.g., embedded, surrounded, bordered, etc.) by the first housing 110 when in its folded position. To describe in another manner, a terminal end 127 of the second end portion 121b of the second housing 120 may contact a surface 117 of the first end portion 111a of the first housing 110 (as shown in FIG. 2B).

The first end portion 111a of the first housing 110 may have a first thickness B1 and the second end portion 111b of the first housing 110 may have a second thickness B2. In an exemplary embodiment shown herein, thicknesses B1 and B2 can be different. For example, thickness B1 of the first end portion 111a can be larger than thickness B2 of the second end portion 111b. The second housing 120 may include a third thickness B3 in the first end portion 121a and the second end portion 121b. In other words, the thickness of the second housing 120 may be the same, and thus, the third thickness B3 remains constant throughout the second housing 120. In some implementations, the third thickness B3 can be smaller than B1 or B2. In some implementations, each of the thickness B2 and the thickness B3 should not exceed the thickness B1. In some implementations, a combined thickness of B2 and B3 can be approximately the same as the thickness of B1. As such, when the display device 10 is in the closed or folded position, the surface 123 of the second housing 120 is aligned (e.g., even, level, flat, flush, etc.) with a surface 119 (positioned near the first end portion 111a of first housing 110). Alternatively, as shown in FIG. 2B, thickness C1 is equal to thickness C2. Hence, this can provide a display device that is thinner as compared to other conventional display devices.

Figure 3A:
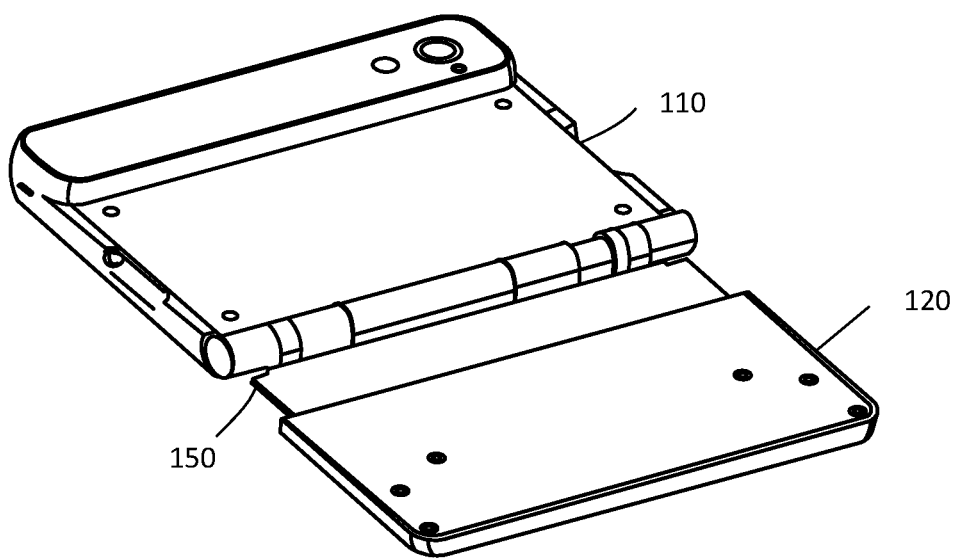
FIG. 3A is a bottom view of an exemplary display device according to an example embodiment.
Figure 3B:
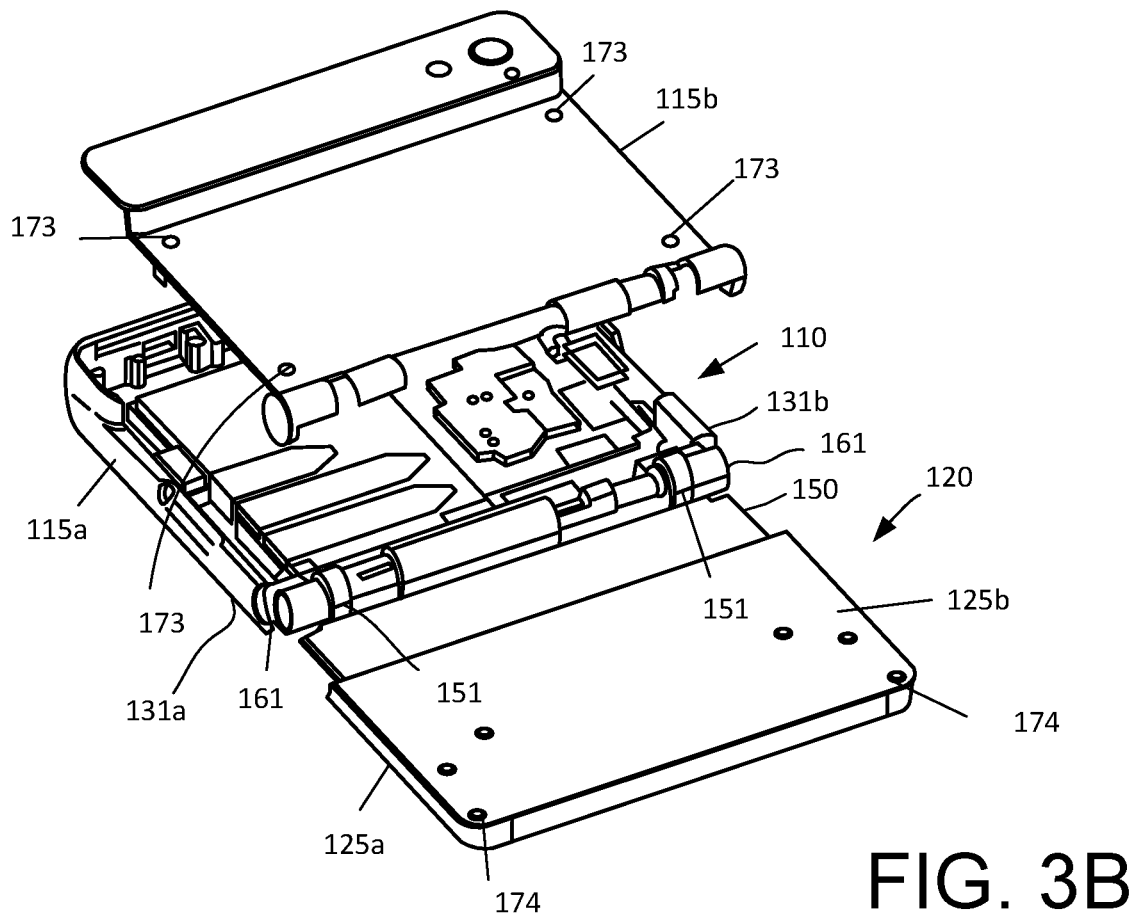
FIG. 3B is a partial exploded view of FIG. 3A of an exemplary display device according to an example embodiment.

FIG. 3A illustrates a schematic view of a back portion of the display device 10 of FIG. 1A in the fully-open position; and FIG. 3B illustrates a schematic view of FIG. 3A in an exploded view of the first housing 110.

Referring to FIG. 3B, the first housing 110 may include a first housing cover 115a and a second housing cover 115b coupled together to form an enclosure (e.g., housing, casing, etc.). The enclosure may include a cavity (e.g., opening, space, etc.) inside. Inside the enclosure of the first housing 110 may contain components for performing various functions of the electronic device 10. For example, the components may include a camera device, a speaker device, sensors (e.g., an optical sensor, a proximity sensor, an infrared sensor, an ultrasonic sensor, etc.), a light emitting diode (LED), a microphone, a flash device, a printed circuit board (PCB), a battery, etc. The first housing 110 will contain substantially most of the components as compared to the second housing 120. With this configuration, more or additional components can be installed therein and easier to repair. In some implementations, the first housing cover 115a and the second housing cover 115b may be coupled together using a fastening member (not shown), such as, a screw, that can be inserted into an opening 173. Other implementations may be employed, such as, for example, other mechanical fasteners, adhesive bonding, welding, etc.

The second housing 120 may include a first housing cover 125a and a second housing cover 125b coupled together forming an enclosure inside. As similar to the first housing 110, the enclosure of the second housing 120 may also include a cavity (e.g., opening, space, etc.) inside. Inside the enclosure of the second housing 120 may contain components for performing various functions of the electronic device 10. In some implementations, the first housing cover 125a and the second housing cover 125b may be coupled together using a fastening member, such as, a screw, that can be inserted into an opening 174. Other implementations may be employed, such as, for example, other mechanical fasteners, adhesive bonding, welding, etc.

In some implementations, the first housing 110 and the second housing 120 can be coupled to be rotatable or foldable relative to each other by a hinge assembly 150. Specifically, the hinge assembly 150 can be disposed between the first housing 110 and the second housing 120. In some implementations, the hinge assembly 150 can be attached (e.g., coupled, joined, etc.) to each of the first housing 110 and the second housing 120.

In use, the hinge assembly 150 may operate to transfer a rotational movement into a translational movement of the first housing 110 or the second housing 120. For example, when the second housing 120 is rotated (as indicated by arrow in FIG. 2A) from a closed or folded position (as shown in FIG. 2B) to an open or unfolded position (as shown in FIG. 2A), the hinge assembly 150 may operate to transfer the rotational movement of the first housing 110 into the translational movement of the second housing 120. That is, the second housing 120 attached to the hinge assembly 150 has moved (e.g., slid) a length A3. Due to the translational movement caused by the hinge assembly 150, the flexible display 100 can be substantially attached (e.g., coupled, connected, affixed, etc.) to the first housing 110 and the second housing 120 during folding and unfolding of the display device 10.

The hinge assembly 150 may include a first hinge portion 151 formed at one side portion (side portion facing the first housing 110) of the hinge assembly 150. The first hinge portion 151 can be integrally formed to the hinge assembly 150. For example, referring to FIG. 4B, the first hinge portion 151 can be coupled (e.g., attached, fastened) to the hinge assembly 150 via a fastening member 177. Other implementations may be employed, such as, for example, other mechanical fasteners, such as rivets, nuts and bolts, clips, pins, adhesive, adhesive bonding, welding, etc. In other implementations, the first hinge portion 151 can be integrally formed by an injection molding process to the hinge assembly 150.

Figure 3C:
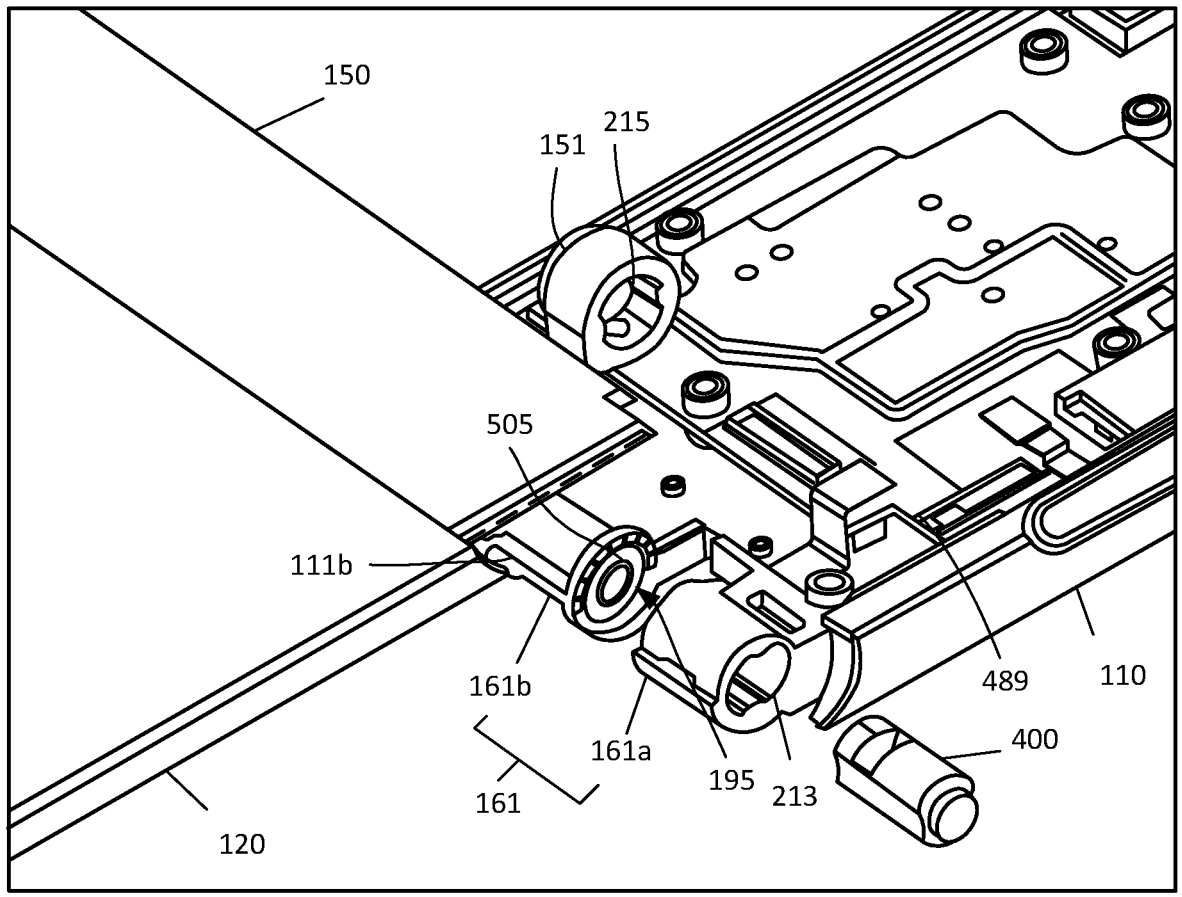
FIGS. 3C and 3D illustrate schematic views of a portion of an exemplary hinge assembly according to an example embodiment.

Referring to FIG. 3C, the first housing 110 may include a second hinge portion 161 formed at the second end portion 111b of the first housing 110 to cooperatively engage with the first hinge portion 151 of the hinge assembly 150. In some implementations, the second hinge portion 161 can be integrally formed to the first cover portion 115a. For example, the second hinge portion 161 can be integrally formed by an injection molding process with the first cover portion 115a of the first housing 110. In other implementations, the second hinge portion 161 can be fastened to the first cover portion 115a, via a fastening member, such as, for example, mechanical fasteners, such as, screws, rivets, clips, pins, adhesive bonding, welding, etc.

In some implementations, the second hinge portion 161 of the first housing 110 may include a first connecting portion 161a and a second connecting portion 161b to cooperatively receive the first hinge portion 151 of the hinge assembly 150. The first connecting portion 161a may be spaced apart (e.g., separated, detached, etc.) from the second connecting portion 161b. Due to the spacing of the first connecting portion 161a and the second connecting portion 161b, an opening 195 is formed between the first and second connecting portions 161a, 161b. A size and shape of the opening 195 should correspond to a size and shape of the first hinge portion 151 for engagement. In other words, the first connecting portion 161a and the second connecting portion 161b can be rotatably coupled to both ends of the firsts hinge portion 151. The engagement of the first hinge portion 151 in the opening 195 should be tight such that the first hinge portion 151 does not move within the opening 195 when cooperatively engaged to the first connecting portion 161a and the second connecting portion 161b of the second hinge portion 161.

While the above describes only one first hinge portion 151 rotatably coupled to one second hinge portion 161, it is apparent that another pair of the first hinge portion 151 and the second hinge portion 161, having the same structures, can be formed on the first housing 110 and/or the hinge assembly 150. For example, as shown in FIG. 3B, one pair of first and second hinge portions 151, 161 can be formed on a first side portion 131a of the first housing 110 and another pair of first and second hinge portions 151, 161 can be formed on a second side portion 131b of the first housing 110. Further, although a structure in which one pair of first housing portion 151 and the second housing portion 161 are illustrated and described, the present disclosure is not limited thereto. For example, three or more first hinge portions 151 and three or more second hinge portions 161 may be present.

Referring back to FIG. 3C, a hinge module 400 may be mounted between the first hinge portion 151 of the hinge assembly 150 and the second hinge portion 161 of the first housing 110. In other words, the hinge module 400 can be inserted into the first hinge portion 151 and the second hinge portion 161. In this regard, one end of the hinge module 400 can be secured in an opening 213 of the second hinge portion 151, and the other end of the hinge module 400 can be secured in an opening 215 of the first hinge portion 151. The hinge module 400 can connect the first and second hinge portions 151, 161 to be relatively rotatable. The hinge module 400 is configured to provide a relative rotational force to the first housing 110 and the second housing 120 upon the relative rotation therebetween. For example, when a user relatively rotates the first housing 110 and/or the second housing 120 by a predetermined angle, the hinge module 400 allows the first housing 110 and/or the second housing 120 to rotate up the predetermined angle.

In some implementations, the opening 213 of the second hinge portion 161 and the opening 215 of the first hinge portion 151 can be the same size as the hinge module 400. In other words, the openings 213, 215 can be the same size as an outer diameter of the hinge module 400 so as to correspondingly engage the hinge module 400.

Figure 3D:
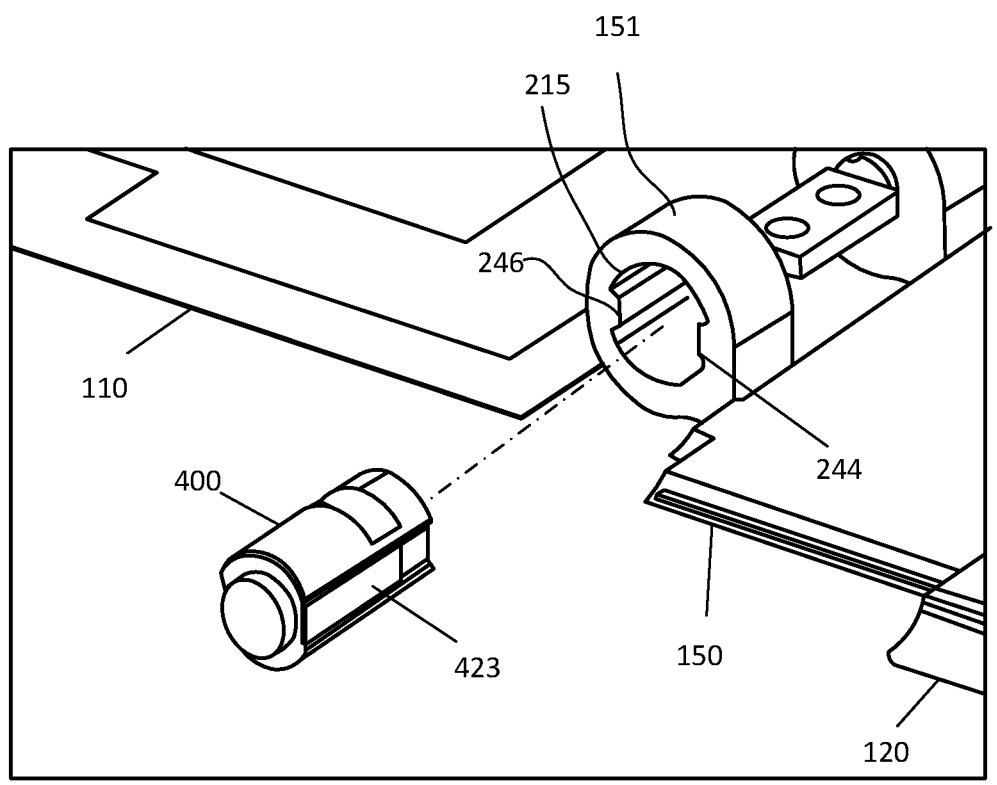

Referring to FIG. 3D, the hinge module 400 can have a slot member 423 formed on a side of the hinge module 400 to cooperatively engage with a first protrusion member 244 (e.g., notch, tongue) in the first hinge portion 151. The slot member 423 helps maintain the hinge module 400 securely in place in the first hinge portion 151 and/or the second hinge portion 161. In some implementations, the hinge module 400 can have a second slot member 423 on the other side (not shown) of the hinge module 400 to cooperative engage with a second protrusion member 246 in the first hinge portion 151.

In an example implementation, the hinge module 400 may be a free-stop hinge that may maintain a preset angle. Therefore, the flexible display 101 may maintain the folded and unfolded states at various configurations. For example, the free-stop hinge can stop at any angle (from 0°~180° and 180°~0°).

FIG. 4A through FIG. 4E illustrate schematic views of a mode detector 500 according to example embodiments. The mode detector 500 can include a flexible connection member 505, a spring member 507, and a spring holder 509.

In some implementations, the flexible connection member 505 can be attached to the first housing 110 (as shown in FIG. 3C). More specifically, one end portion 533a of the flexible connection member 505 can be attached to the second hinge portion 161 (i.e., the second connecting portion 161b) and the other end portion 533b can be attached to a printed circuit board (PCB) 498 to receive information to determine the spatial relationship (e.g., angle) between the first housing 110 and the second housing 120 and change the mode of operation accordingly. In an example implementation described herein, the flexible connection member 505 can include a flexible printed circuit.

Figure 4A:
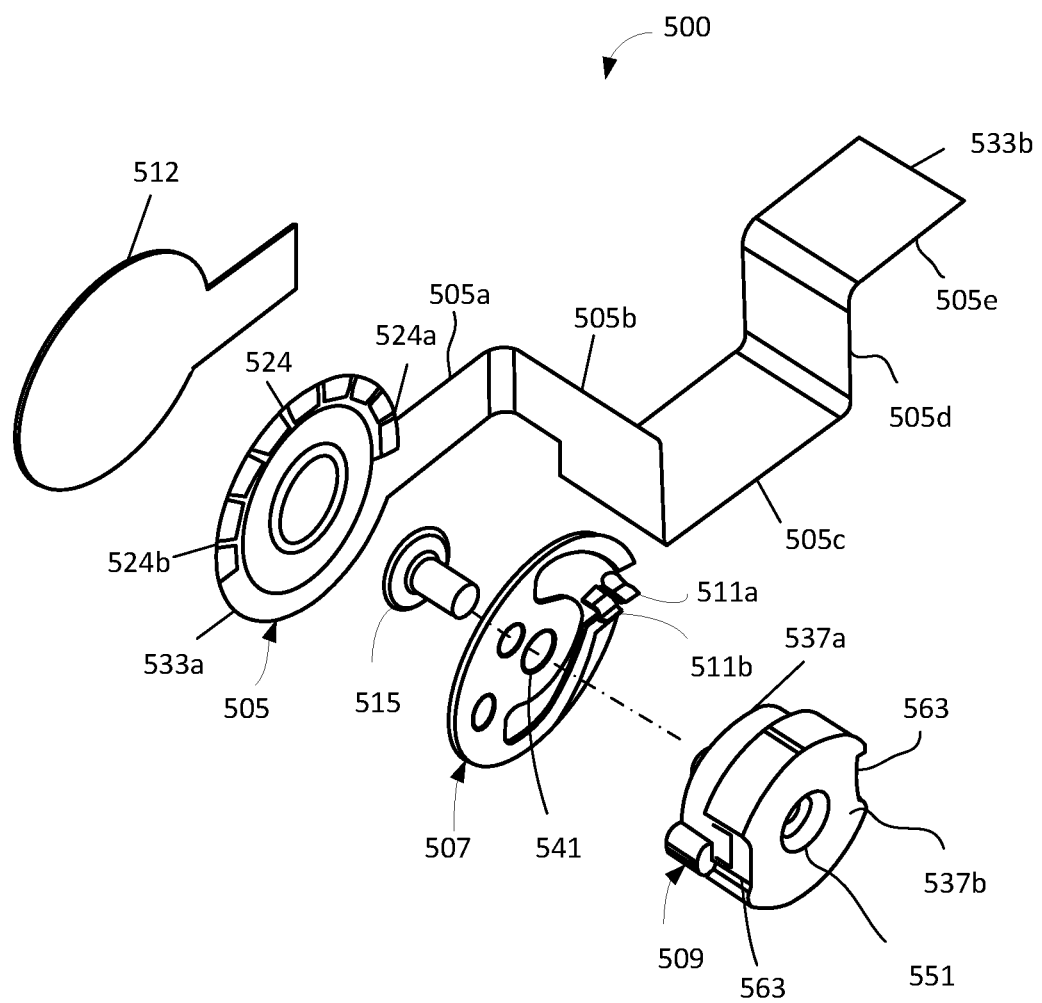
FIG. 4A is an exploded view of an exemplary mode detector according to an example embodiment
Figure 4B:
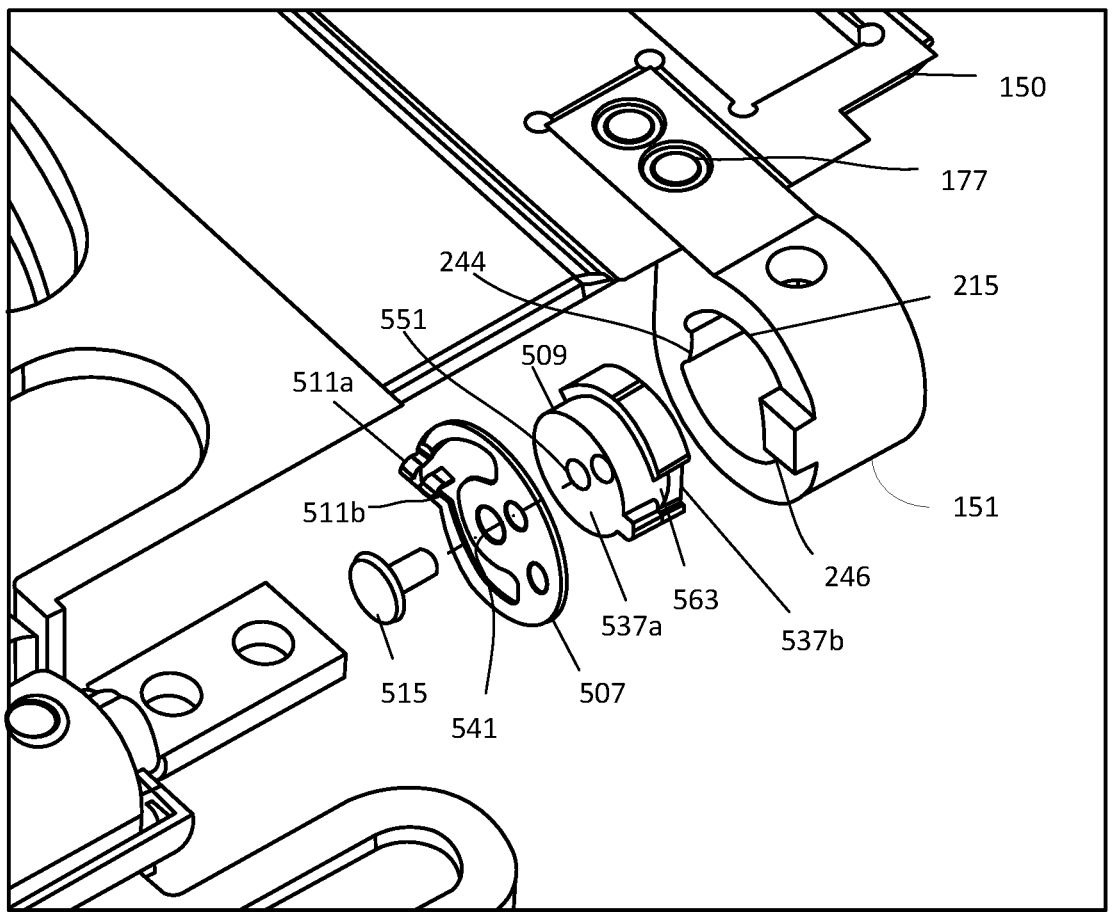
FIGS. 4B and 4G illustrate various schematic views of a portion of an exemplary display device according to an example embodiment.
Figure 4C:
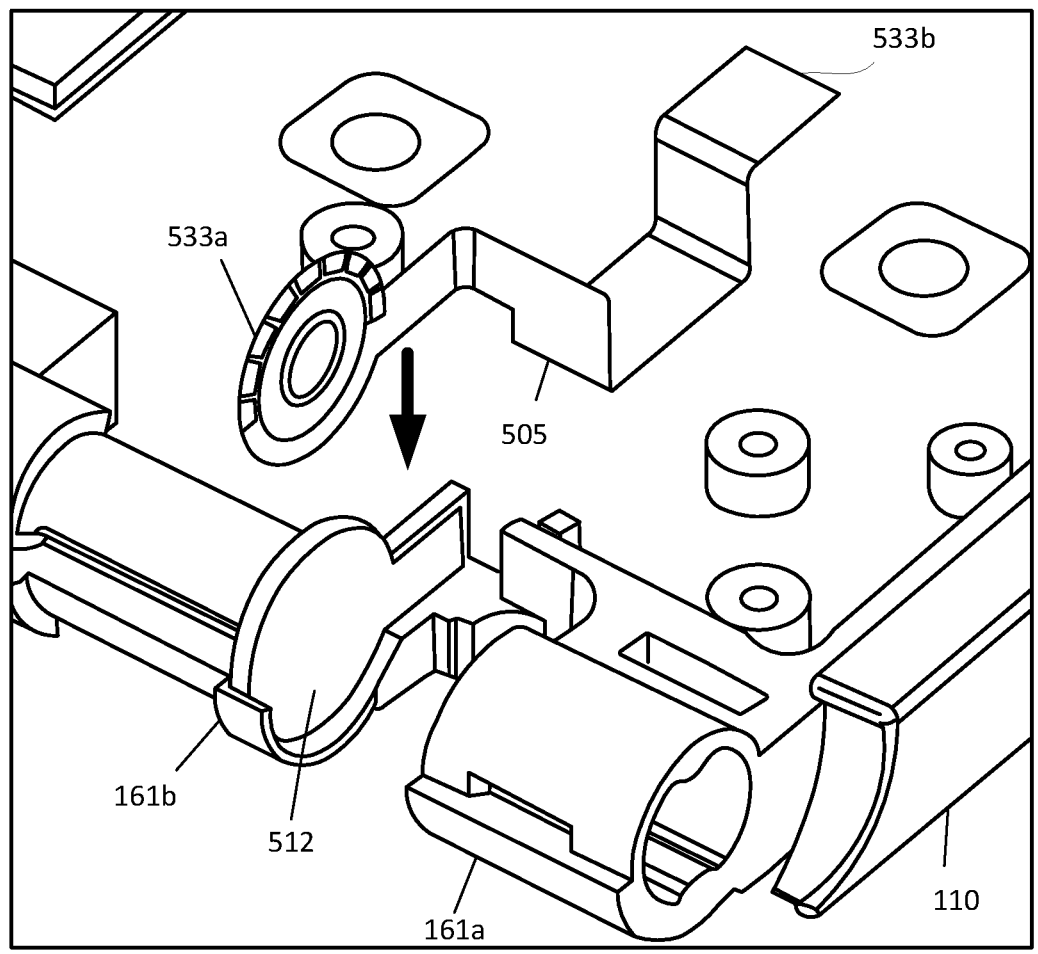

Referring to FIG. 4C, the end portion 533a of the flexible connection member 505 can be attached to the second connecting portion 161b via an adhesive 512. Other implementations may be used to attach the end portion 533a of the flexible connection member 505 to the second connecting portion 161b, such as, for example, welding, glue, mechanical fasteners, e.g., screws, etc. In some implementations, a shape of the adhesive 512 can correspond to a shape of the end portion 533a of the flexible connection member 505.

In some implementations, the end portion 533b of the flexible connection member 505 can be attached to the PCB 498 via a connector (not shown). The connector provides a connecting device so that signal(s) between the flexible connection member 505 and the PCB 498 can be communicated. In some implementations, a fastener may be used to securely attach the connector to the PCB 498. For example, an adhesive, an adhesive bonding, glue, a mechanical fastener, e.g., a screw, may be used to attach the connector to the PCB 498.

In some implementations, the flexible connection member 505 can be made from metal. For example, the metal can be cooper, aluminum, silver, nickel, gold, etc., or a combination thereof. Other implementations of material may be used, such as, plastic, e.g., polyimide, polyester, polyethylene naphthalate (PEN), polyethylene terephthalate (PET), solder mask, etc., to form the flexible connection member 505. The flexible connection member 505 should have sufficient flexibility (e.g., be sufficiently bendable) for the flexible connection member 505 to operate within the first housing 110. In other words, the connection member 505 can be bent (e.g., turned, twisted, curved) to conform around electronic components inside of the first housing 110. For example, as shown in FIG. 4A, the flexible connection member 505 can have a first connection portion 505a, a second connection portion 505b, a third connection portion 505c, a fourth connection portion 505d, and a fifth connection portion 505e. In an example implementation described herein, the first connection portion 505a can be bent in a first direction with respect to the second connection portion 505b, the second connection portion 505b can be bent in a second direction with respect to the third connection portion 505c, the third connection portion 505c can be bent in a third direction with respect to the fourth connection portion 505d, and the fourth connection portion 505d can be bent in a fourth direction with respect to the fifth connection portion 505e.

In some implementations, the flexible connection member 505 can be a single layer. In other implementations, the flexible connection member 505 can be a multi-layer, e.g., at least two layers.

The flexible connection member 505 can include a plurality of contacts 524 on the end portion 533a of the flexible connection member 505. In some implementations, the contacts 524 can be defined as pins, grooves, needles, etc. The plurality of contacts 524 can correspondingly indicate positions of the spatial relationship of the first housing 110 with respect to the second housing 120. For example, a first contact 524a may indicate a closed configuration (as shown in FIG. 1B) of the display device 10 and a last contact 524b may indicate an open configuration (as shown in FIG. 1A) of the display device 10. The contacts 524 between the first contact 524a and the last contact 524b can indicate other various configurations of the display device 10, e.g., a tent configuration, a laptop configuration, etc. In one example implementation described herein, there may be nine contacts on the end portion 533a of the flexible connection member 505 to indicate the various configurations, and to generate a signal indicating a change of mode of the display device 10, accordingly.

In some implementations, the end portion 533a of the flexible connection member 505 may include a circular shape such that the plurality of contacts 524 are formed in an arcuate configuration (e.g., curved, circular). In other words, the plurality of contacts 524 conform to the shape of the end portion 533a of the flexible connection member 505. Other implementations besides a circle can be employed to form the end portion 533a of the flexible connection member 505, such as, for example, a semi-circle, an oval, etc.

Referring to FIGS. 4A and 4B, the spring 507 can be rotatably coupled to the spring holder 509 via a fastener 515, such as, a screw, for example. In this regard, the spring holder 509 may include a first side portion 537a and a second side portion 537b, opposite the first side portion 537a, in which the spring 507 can be attached to the first side portion 537a. The fastener 515 can be inserted into an opening 541 in the spring 507 and an opening 551 in the spring holder 509 for attachment.

In some implementations, the springer holder 509 can be inserted into the opening 215 of the second hinge portion 161. In other words, the second side portion 537b of the spring holder 509 is directed towards the opening 215 to be inserted thereof. In some implementations, the spring holder 509 may include a groove 563 on a sidewall thereof that cooperatively engage with the protruding member 246 formed on an inner surface of the first hinge portion 151. In some implementations, the spring holder 509 may include a second groove 563 (shown in FIG. 4A) on the other sidewall of the spring holder 509 to cooperatively engage with the protruding member 244 formed on the inner surface of the second hinge portion 161. The groove 563 helps secure the spring holder 509 from moving (e.g., rotating) within the opening 215 of the first hinge portion 151.

In some implementations, the spring holder 509 may interact with the hinge module 400 inside of the first hinge portion 151. In this regard, the spring holder 509 can rotate along a same axis as the hinge module 400. In other words, the spring holder 509 and the hinge module 400 can be co-axially aligned. In some implementations, the spring holder 509 and the hinge module 400 can move (e.g., rotate) simultaneously. In other words, when the hinge module 400 rotates, the spring holder 509 rotates at a same rotational rate or speed with the hinge module 400. In addition, because the spring 507 is attached to the first side portion 537a of the spring holder 509, the spring 507 relatively rotates with the spring holder 509. In some implementations, the spring holder 509 may be coupled to the hinge module 400. For example, the spring holder 509 may include a groove(s) and a projection(s) on the second side portion 537b to cooperatively engage with a groove(s) and a projection(s) on the hinge module 400, so as to be relatively movable with each other. In other implementations, the spring holder 509 may be coupled to the hinge module 509 with a fastener, such as, for example, a mechanical fastener, e.g., a screw, a rivet, a nut and bolt, a clip, a pin, an adhesive, an adhesive bonding, glue, welding, etc.

Referring back to FIG. 4A, the spring 507 may include a first end portion 511a and a second end portion 511b. In this exemplary implementation, the first end portion 511a may be defined as a first contact portion and the second end portion 511b may be defined as a second contact portion. In some implementations, the first contact portion 511a and the second contact portion 511b can be adjacent to each other. In other words, the first contact portion 511a may face the second contact portion 511b.

The first contact portion 511a and the second contact portion 511b may contact at least one of the plurality of contacts 524 on the flexible connection member 505. When the first contact portion 511a and the second contact portion 511b contact one of the contacts 524, information is sent to a processor in the display device 10 to determine a position of the first housing 110 and/or the second housing 120 and to determine the corresponding mode of operation. In operation, when the first housing 110 and/or the second housing 120 moves (e.g., rotates) with respect to each other, the hinge module 400 may cause the spring 507, which may be attached to the spring holder 509, to rotate and contact one of the plurality of contacts 524. Each contact 524 may indicate the spatial relationship (at a predetermined angle) between the first housing 110 and the second housing 120, and may change the mode of operation accordingly. For example, when the display device 10 is in a closed configuration, the display 100 can be turned off. When the display device 10 is in an open configuration, the display area 101 of the display 100 can be displayed entirely. When the display device 10 is in a tent configuration, a portion of the display area 101 of the display 100 can be displayed.

Figure 4D:
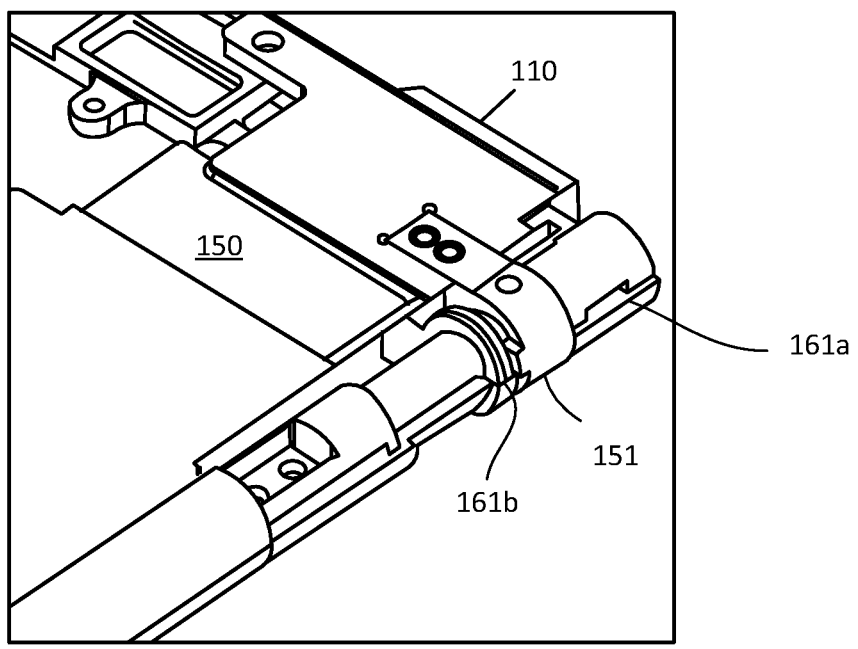
Figure 4E:
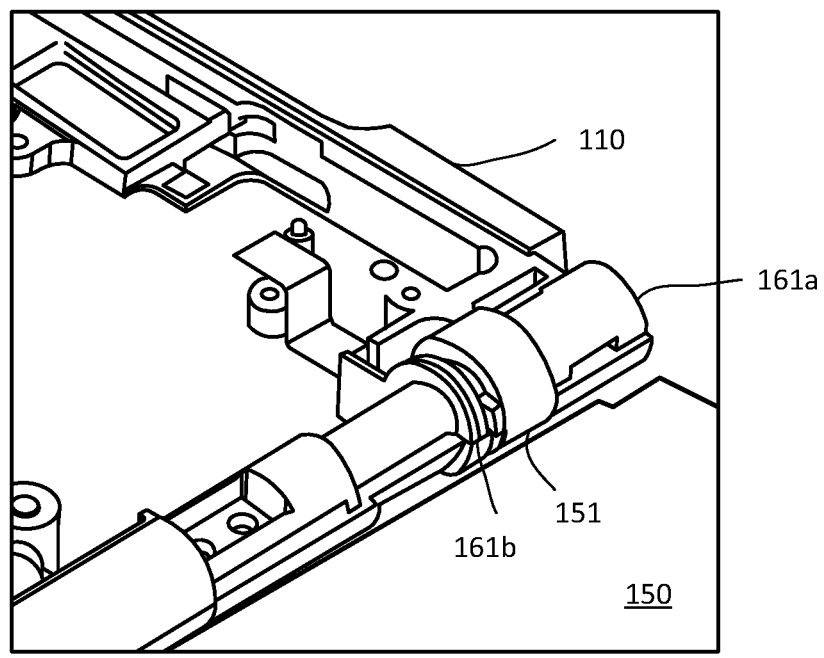
Figure 4F:
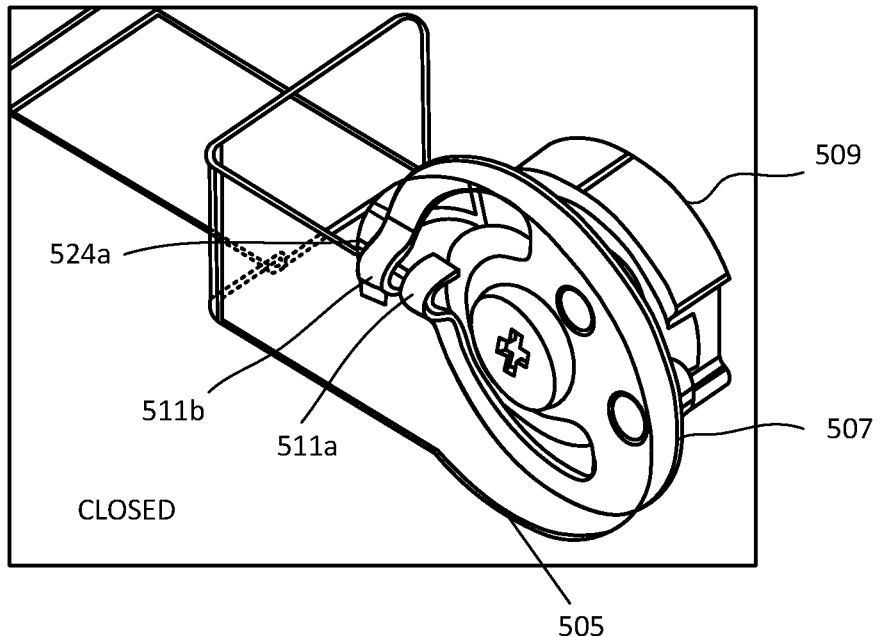
Figure 4G:
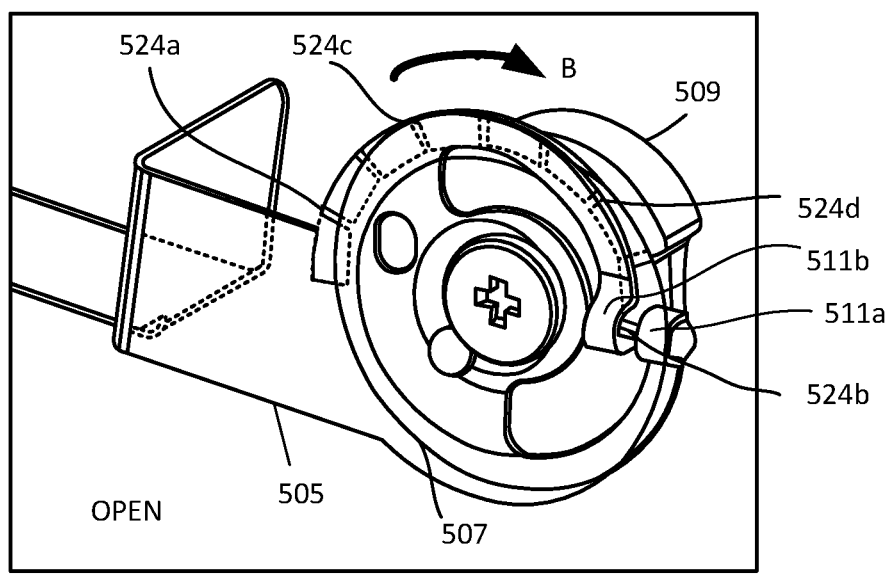

In some implementations, the first contact portion 511a and the second contact portion 511b may include a ridge, when viewed from the side, as shown in FIGS. 4F and 4G. In other words, the first contact portion 511a and the second contact portion 511b may have an upside-down U-shape, when viewed from the side. In this regard, the shape of the first contact portion 511a and the second contact portion 511b may permit the first contact portion 511a and the second contact portion 511b to contact one of the plurality of contacts 524 on the flexible connection member 505.

In some implementations, the spring 507 may have a circular shape conforming to the shape of the first end potion 533a of the flexible connection member 505. Other shapes may be employed as long as the spring 507 complements the shape of the first end potion 533a of the flexible connection member 505.

In some implementations, the spring 507 can be made from metal. For example, the spring 507 can be made from phosphor bronze.

Due to the direct mechanical interaction of the flexible connection member 505 and the spring 507, no additional components (e.g., switch, sensors, etc.) are required. In other words, the flexible connection member 505 and/or the spring 507 are configured to fit with a conventional hinge module, which reduces manufacturing cost and/or installation time.

FIGS. 4D and 4E illustrate schematic views of a portion of the hinge assembly 150 (without the second housing 120) according to an example embodiment. FIG. 4D illustrates the display device 10 via the hinge assembly 150 in a closed configuration; and FIG. 4E illustrates the display device 10 via the hinge assembly 150 in an open configuration. FIGS. 4F and 4G illustrate schematic views of the mode detector 500 during a closed configuration and an open configuration. The mode detector 500 of FIG. 4F corresponds to the configuration of the hinge assembly 150 of FIG. 4D, and mode detector 500 of FIG. 4G corresponds to the configuration of the hinge assembly 150 of FIG. 4E As shown in FIG. 4F, when the display device 10 is in the closed configuration or when the hinge assembly 150 is in a closed position (FIG. 4D), the first contact portion 511a and the second contact portion 511b of the spring 507 may contact the first contact 524a of the flexible connection member 505. Hence, the mode detector 500 may transmit a signal to indicate that the first and second housings 110, 120 of the device 10 are in a closed configuration so that the display 100 does not display any visual content or turns off the display.

As shown in FIG. 4G, when the display device 10 is in the open configuration or when the hinge assembly 50 is in an open position (FIG. 4E), the first contact portion 511a and the second contact portion 511b of the spring 507 may contact the second contact 524b of the flexible connection member 505, located on the opposite side of the flexible connection member 505. In this regard, the spring 50 is rotated in a clockwise direction, as shown by arrow B in FIG. 4G. Hence, the mode detector 500 may transmit a signal to indicate that the first and second housings 110, 120 are an open configuration so that the display 100 displays visual content.

In other implementations, when the display device 10 is in a tent configuration, the first contact portion 511a and the second contact portion 511b of the spring 507 may contact one of the contacts that are between the first contact 524a and the second contact 524b. For example, the first contact portion 511a and the second contact portion 511b may contact the second contact (contact 524c) to the right of first contact 524a or the second contact (contact 524d) to the left of second contact 524b (as shown in FIG. 4G). Hence, the mode detector 500 may transmit a signal to indicate that the first and second housings 110, 120 are facing each other at an angle (e.g., approximately 45°~135°) so that the display 100 displays visual content on a portion of the display 100.

Figure 5A:
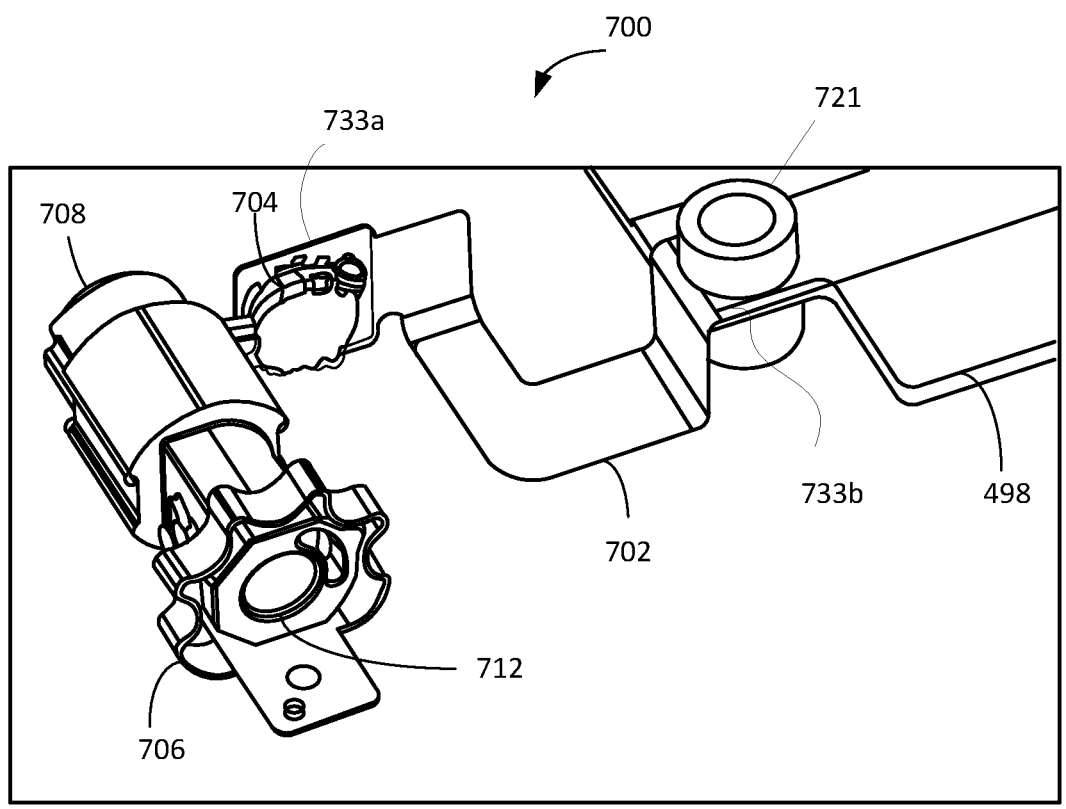
FIGS. 5A through 5M illustrates various schematic views of an exemplary mode detector, according to another example embodiment.

FIG. 5A illustrates a schematic view of a mode detector 700 in accordance to another example embodiment. The exemplary mode detector 700 as described herein will function similarly as the mode detector 500. Similar elements as described in FIG. 1A through FIG. 4G will be not be discussed further in detail in this section.

Referring to FIG. 5A, the mode detector 700 may include a flexible connection member 702, a mode detector 704, a spring member 706, and a hinge module 708.

In some implementations, the flexible connection member 702 can be used to exchange information with the mode detector 704. In some implementations, a first end portion 733a of the flexible connection member 702 can be attached to a portion of the second hinge portion 161 (i.e., the second connecting portion 161b) and a second end portion 733b can be attached to a printed circuit board (PCB) 498 to receive information to determine the spatial relationship (e.g., angle) between the first housing 110 and the second housing 120 and change the mode of operation accordingly. In one example implementation, the flexible connection member 702 can include a flexible printed circuit.

Figure 5B:
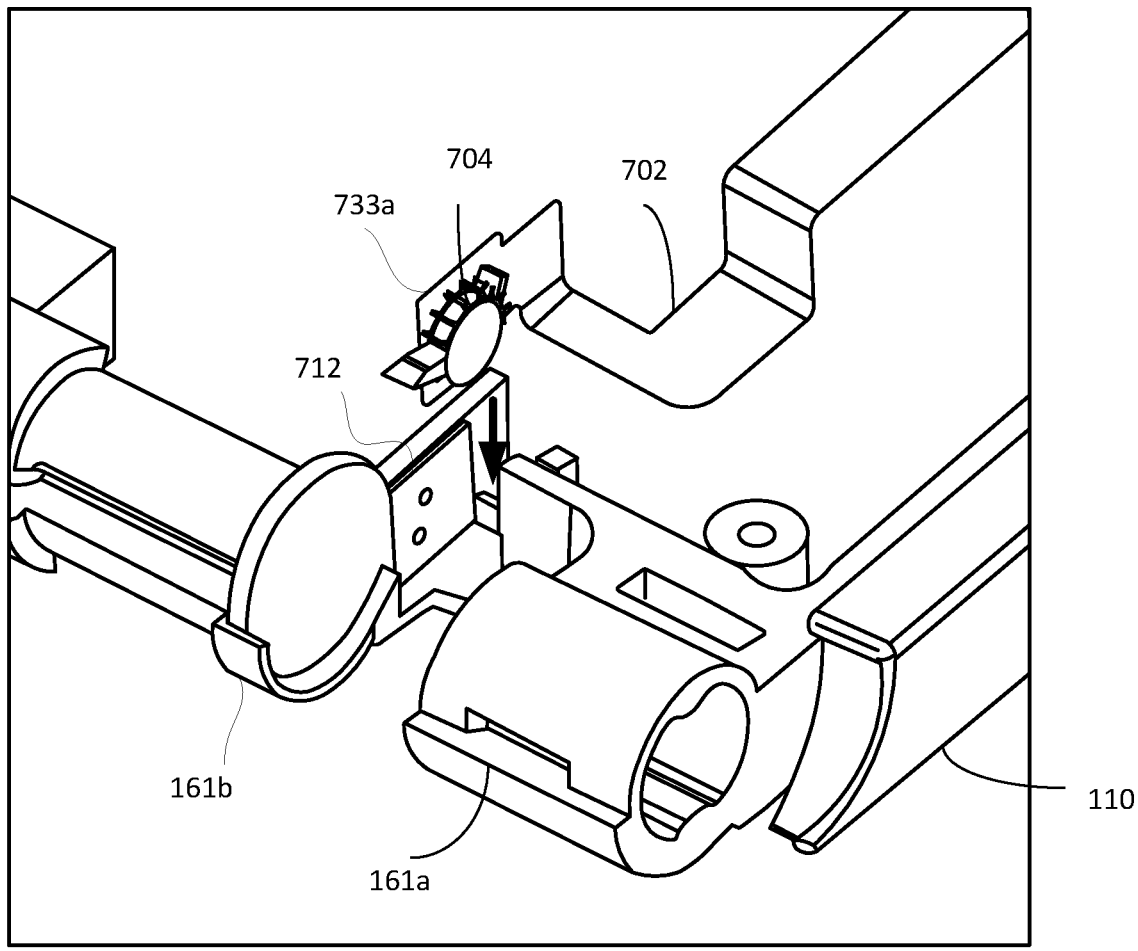

Referring to FIG. 5B, the first end portion 733a of the flexible connection member 702 can be attached to the second hinge portion 161 via an adhesive 712. Other implementations may be used to attach the first end portion 733a of the flexible connection member 702 to the first housing 110, such as, for example, welding, glue, mechanical fasteners, e.g., screws, etc. In some implementations, additional layers may be employed to attach the first end portion 733a to the portion of the second hinge portion 161. For example, a stiffener layer and/or a bounding layer may be used.

In some implementations, the second end portion 733b of the flexible connection member 702 can be attached to the PCB 498 via a connector (not shown). In some implementations, as shown in FIG. 5A, the second end portion 733b can be coupled to a connecting member 721 to couple the second end portion 733b to the PCB 498. In some implementations, a fastener may be used to securely attach the second end portion 733b to the PCB 498. For example, the fastener may be a mechanical fastener, e.g., a screw, a nut and bolt, a clip, a pin, an adhesive, an adhesive bonding, glue, etc.

In some implementations, the flexible connection member 702 can include a plastic material, such as, for example, polyethylene terephthalate (PET) or thermoplastic polyimide (PI). Other materials may be implemented, such as, for example, metal, e.g., cooper, aluminum, silver, nickel, gold, etc., or a combination thereof The mode detector 704 can be disposed at the first end portion 733a of the flexible connection member 702. In some implementations, the mode detector 704 may be coupled to the first end portion 733a via adhesive, for example. The mode detector 704 can interact with the hinge module 708 and determine the relative spatial positions of the first housing 110 with respect to the second housing 120, which will be described later.

Figure 5C:
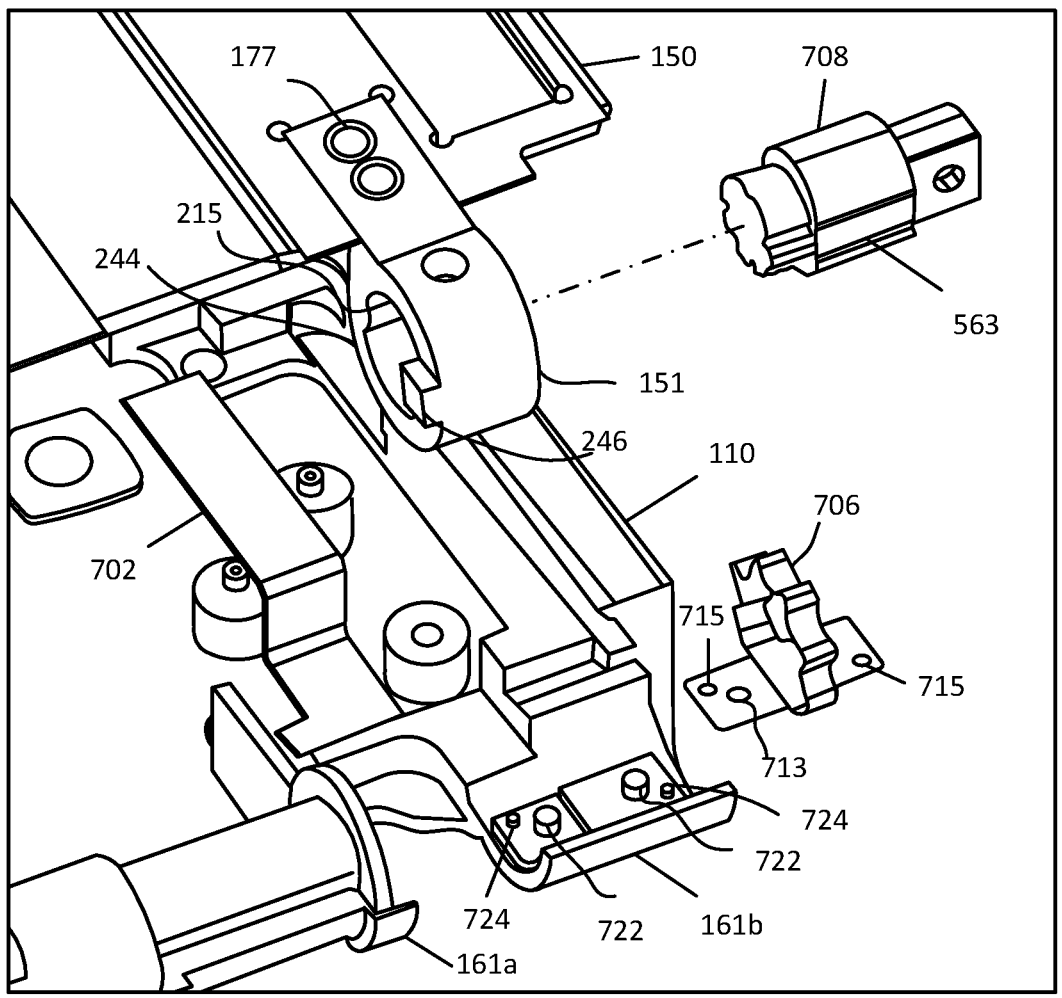
Figure 5D:
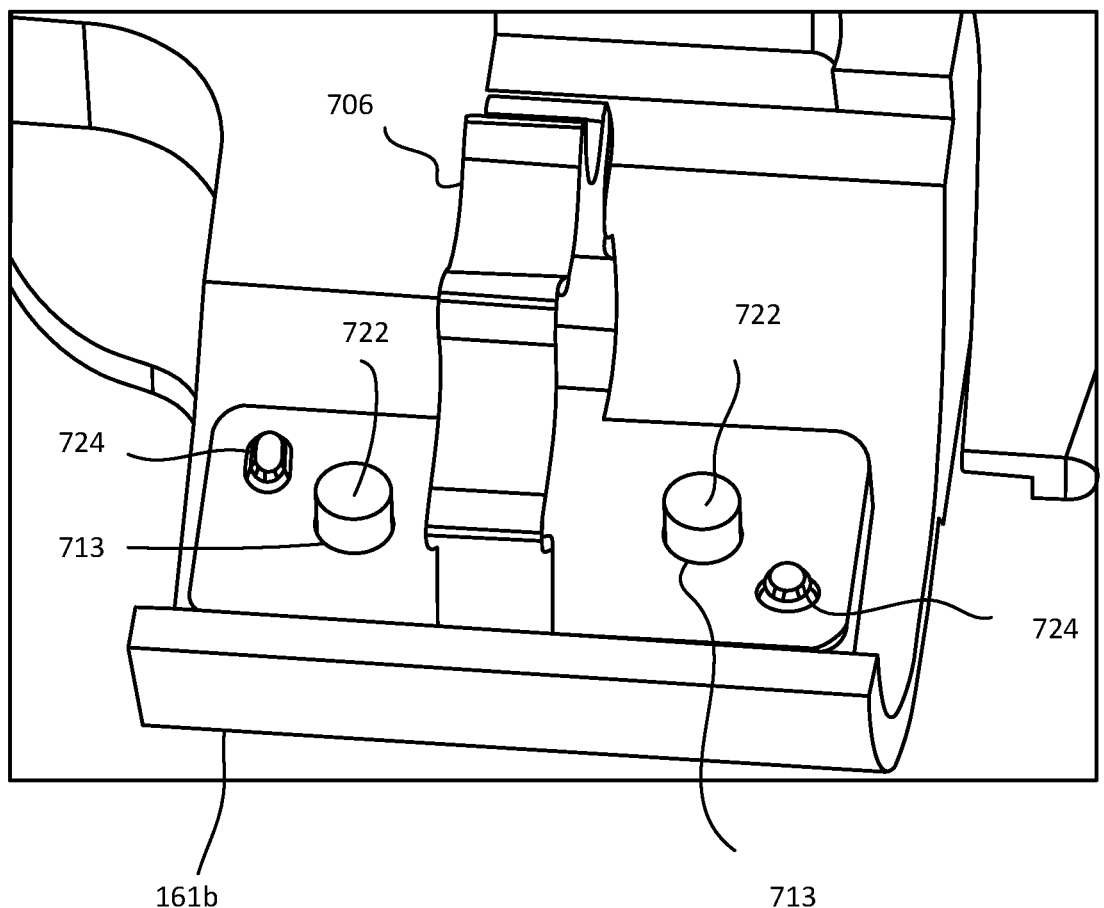

Referring to FIGS. 5C and 5D, the spring 706 can be disposed on the second connecting portion 161b of the second hinge portion 160. In some implementations, the spring 706 may be coupled to the second connecting portion 161b via fasteners, for example. In this regard, the spring 706 may include first openings 713 and second openings 715 to cooperatively engage with first projection members 722 and second projection members 724, respectively, formed on the second connecting portion 161b. In other words, the first projection members 722 may fit within the first openings 713 and the second projection members 724 may fit within the second openings 715. In some implementations, the first projection members 722 may be larger (e.g., diameter) than the second projection members 724, and accordingly, the first openings 713 may be larger (e.g., diameter) than the second openings 715. The first projection members 722 may be used as an alignment device to cooperatively engage (fit) the first openings 713 of the spring 706 to the second connecting portion 161b. The second projection members 724 may be used to fasten the spring 706 to the second connecting portion 161b. In some implementations, the second projection members 724 may include a mechanical fastener, such as, for example, a screw, an anchor bolt, a nut and bolt, a toggle bolt, a clip, a pin, a rivet, etc. In some implementations, the spring 706 can be welded to the second connecting portion 161b.

In some implementations, the spring 706 can be made from a flexible material to deform and return back to its original shape. For example, the spring 706 can be made from metal, such as, stainless steel. Other materials may be used as long as the material is deformable and retains a shape-memory effect. For example, the spring 706 can be made from a plastic material.

Figure 5F:
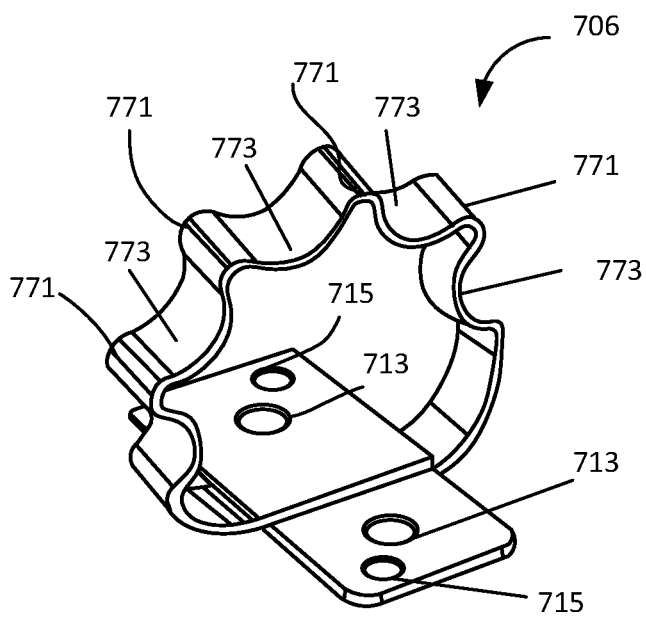
Figure 6:
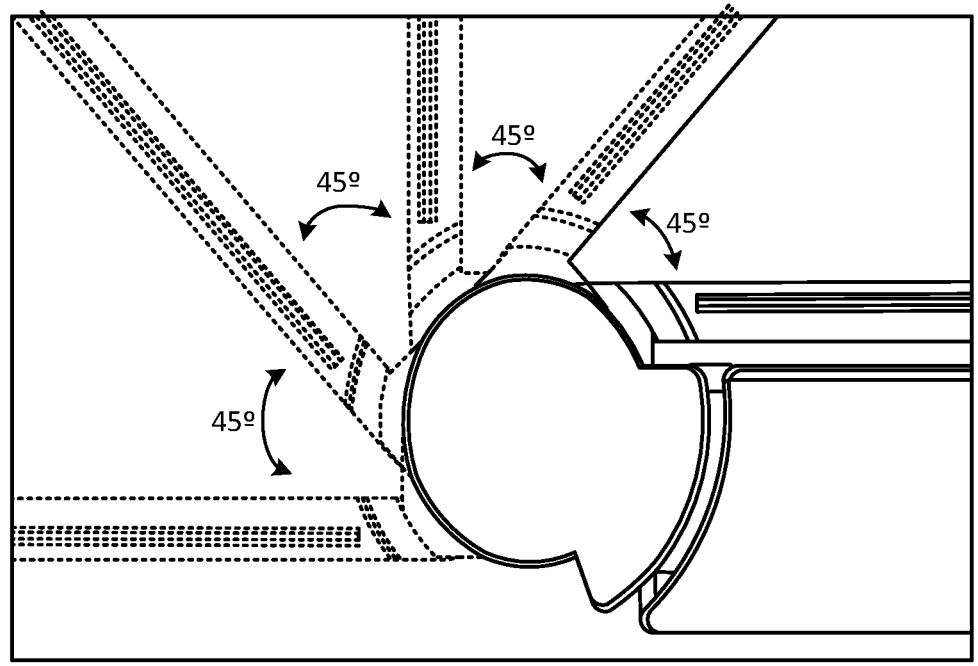
FIG. 6 illustrates a schematic view of a portion of the hinge assembly according to an example embodiment.
Figure 7:
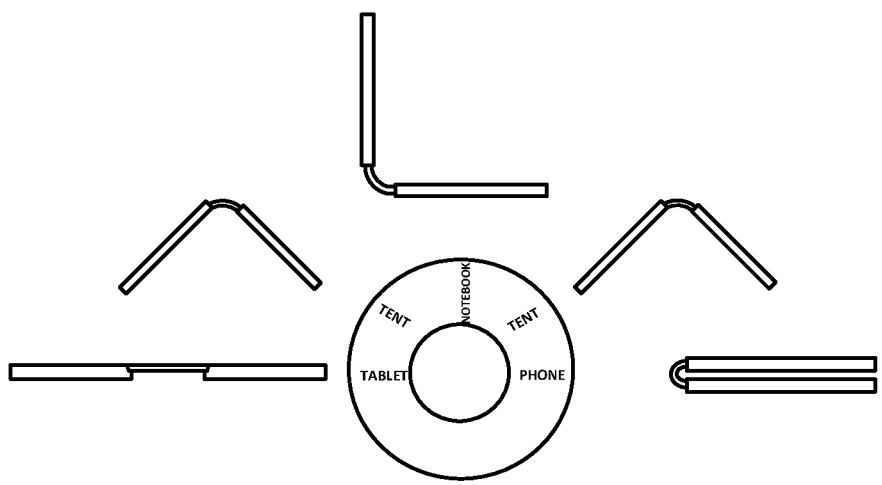
FIG. 7 is a diagram illustrating various configurations of an exemplary display device.

In some implementations, the spring 706 may have a generally circular shape with peak portions 771 and valley portions 773. In this regard, the spring 706 can be defined as having a star-like shape, as shown in FIG. 5F. Other shapes may be used as long as the spring 706 has a shape to obtain stopping positions. In some implementations, the spring 706 can be designed to stop the display device 10 at every 45° direction. In one implementation as illustrated herein, the spring 706 can have four stop points. For example, starting at an initial stop, the display device 10 is at 0 degrees (e.g., closed mode); at a first stop, the display device 10 is at 45 degrees (e.g., tent mode); at a second stop, the display device 10 is at 90 degrees (e.g., laptop mode); at a third stop, the display device 10 is at 135 degrees (e.g., tent mode); and at a fourth stop, the display device 10 is at 180 degrees (e.g., tablet mode), as shown in FIG. 6.

Figure 5E:
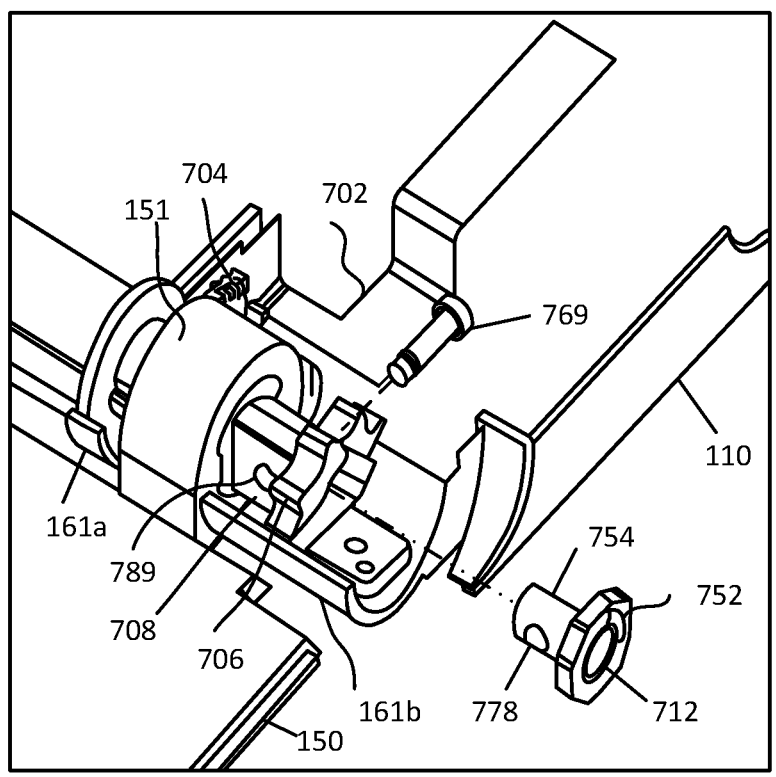

Referring to FIG. 5E, the spring 706 can be engaged with a lever member 712 disposed within the spring 706. In this regard, the lever member 712 may rotate within the spring 706 and stop at various positions (e.g., every 45 degrees) or, in one exemplary implementation, four stops. Further, the lever member 712 can be coupled to the hinge module 708 such that the lever member 712 prevents the hinge module 708 from rotating (i.e., stopping at certain positions) and locking the display device 10 at an angle (e.g., between 0° to 180°).

Figure 5G:
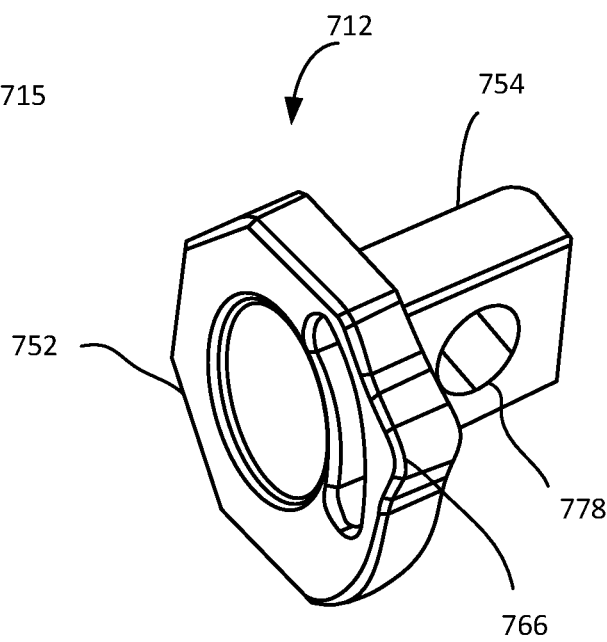

In some implementations, the lever member 712 may include a cam portion 752 and an elongate portion 754. The cam portion 752 may include a lever portion 766 (as shown in FIG. 5G) that interacts with the spring 706. In some implementations, the lever portion 766 can extend further in a radial direction than other portions of the cam portion 752 so that the lever portion 766 can interact (e.g., engage) with the spring 706. In this regard, the lever member 712 may be rotated until the lever portion 766 reaches one of the peak portions 771 of the spring 706. As a result, this stops (e.g., locks) the display device 10 in one of the configurations (e.g., tent mode, laptop mode, or tablet mode).

In some implementations, the elongate portion 754 of the lever member 712 can include an opening 778. The opening 778 can be used to securely couple the lever member 712 to the hinge module 708. In some implementations, the elongate portion 754 may be disposed within (i.e., inside) the hinge module 708. In other words, the elongate portion 754 of the lever member 712 can be inserted into a lumen of the hinge module 708 (as shown in FIG. 5E). In order to secure the lever member 712 and the hinge module 708 together, a fastener 769 can be inserted into the opening 778 of the lever member 712 and an opening 789 in the hinge module 708. In other words, the opening 778 and the opening 789 are aligned and securely coupled together via the fastener 769. In some implementations, the fastener 769 can be a mechanical fastener, such as, for example, a screw, a nut and bolt, a rivet, a pin, a clip, etc.

Referring back to FIG. 5C, the hinge module 708 can be coupled to a portion of the first hinge portion 151 of the hinge assembly 150. In this regard, the hinge module 708 can be disposed within the opening 215 of the first hinge portion 151. In some implementations, the hinge module 708 can also be coupled to a portion of the second hinge portion 161 (e.g., the second connecting portion 161b) (not shown). In this regard, the hinge module 708 can be disposed within the opening 213 of the second connecting portion 161b. As similarly discussed above, the hinge module 708 can include a groove(s) 563 on the sidewall(s) of the hinge module 708 to cooperatively engage with the projection members 244, 246 formed on the inner surface of the first hinge portion 151.

In an example implementation, the hinge module 708 may be a gear shaft that may rotate the first housing 110 and/or the second housing 120 to provide various configurations of the display device 10. For example, the hinge module 708 can stop at angles of 45°, 90°, 135°, and 180°.

Figure 5H:
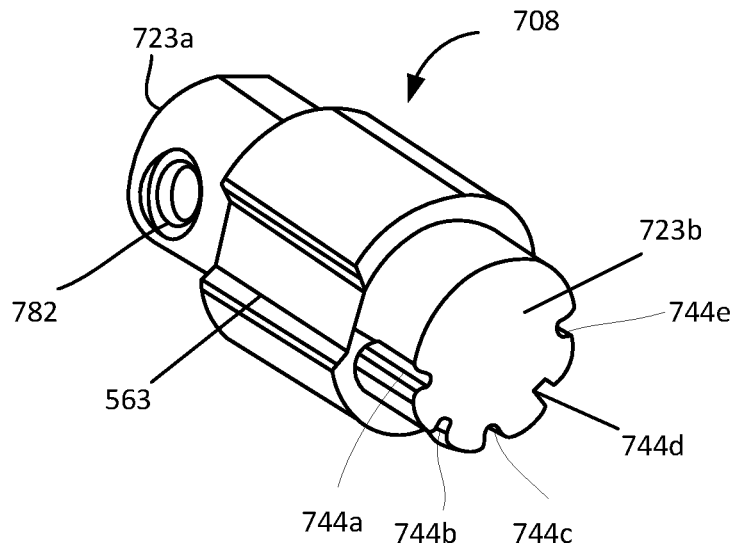

Referring to FIG. 5H, the hinge module 708 may include a first end portion 723a and a second end portion 723b. The first end portion 723a can be coupled to the lever member 712 as previously discussed. The second end portion 723b can interface with the mode detector 704. In some implementations, the second end portion 723b of the hinge module 708 may include a plurality of notches 744a, 744b, 744c, 744c, 744d to indicate various positions of the display device 10 which may correspond to a mode of operation of the display device 10. In an example implementation described herein, there may be five notches formed on the second end portion 723b of the hinge module 708, each notch 744a, 744b, 744c, 744c, 744d indicating different modes.

In operation, when the first housing 110 and/or the second housing 120 moves (e.g., rotates), this causes the hinge module 708 to rotate accordingly. Since the first end 723a of the hinge module 708 is engaged to the spring 706 via the lever member 712, the hinge module 708 stops at one of four step stops (e.g., at the peak portions 771 of the spring 706). On the second end portion 723b of the hinge module 708, the mode detector 704 detects the position (i.e., angle) of the first housing 110 and/or the second housing 120 based on the position of the mode detector 704 with respect to the notches 744a, 744b, 744c, 744c, 744d. For example, the first notch 774a may indicate the display device 10 in a closed configuration and send a signal to the processor to turn off the display; the second notch 744b may indicate the display device 10 in a tent configuration and send a signal to the processor to display the visual content on a partial screen view; the third notch 744c may indicate the display device 10 in a laptop configuration and send a signal to the processor to display the visual content on a half-screw view; the fourth notch 744d may indicate the display device 10 in a tent configuration and send a signal to the processor to display the visual content on a partial screen view; and the fifth notch 744e may indicate the display device 10 in a fully open configuration and send a signal to the processor to display the visual content on a full screen view.

Figure 5I:
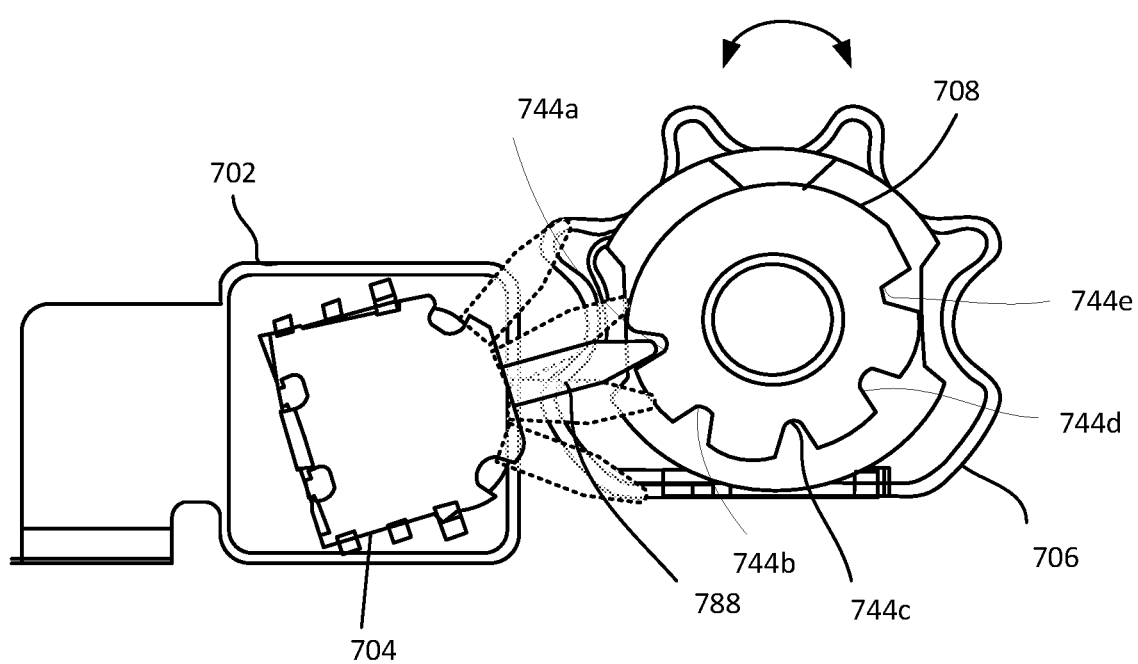

Referring to FIG. 5I, the mode detector 704 may include a needle 788 to initiate (e.g., trigger) a signal to the processor and indicate the position of the display device 10. In this regard, while the hinge module 708 is moving (e.g., rotating), the needle 788 may come in contact with one of the plurality of notches 744a, 744b, 744c, 744c, 744d on the hinge module 708. This indicates one of the configurations of the display device 10. In some implementations, the needle 788 can be move in a first direction and a second direction, opposite the first direction. In one implementation as described herein, the first direction can be defined in a down direction (when the hinge module 708 is rotating in a clockwise direction), and the second direction can be defined as an up direction (e.g., when the hinge module 708 is rotating in a counter-clockwise direction).

Figure 5J:
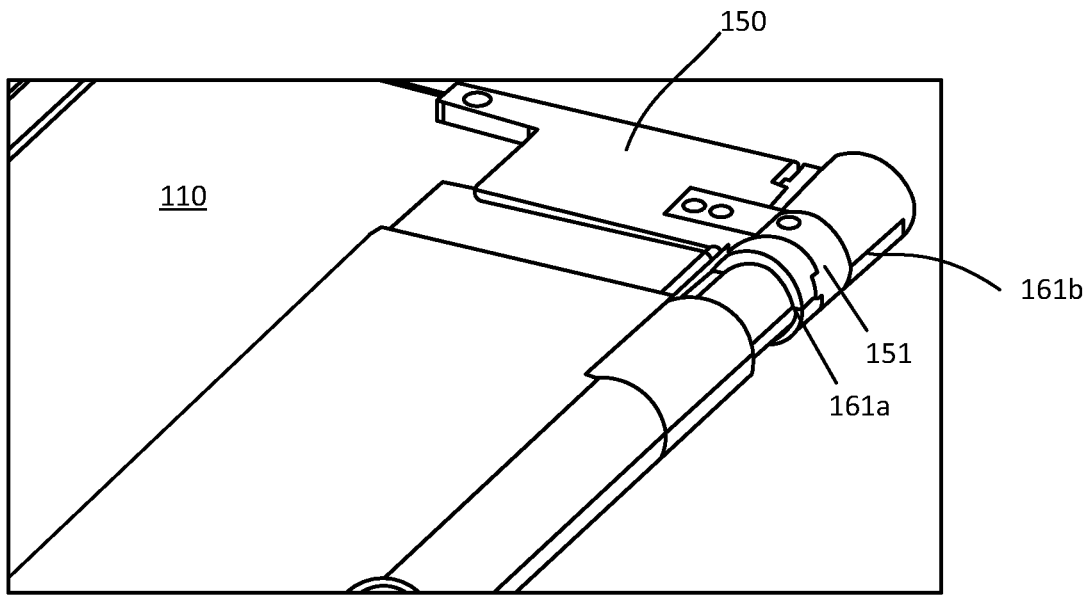
Figure 5K:
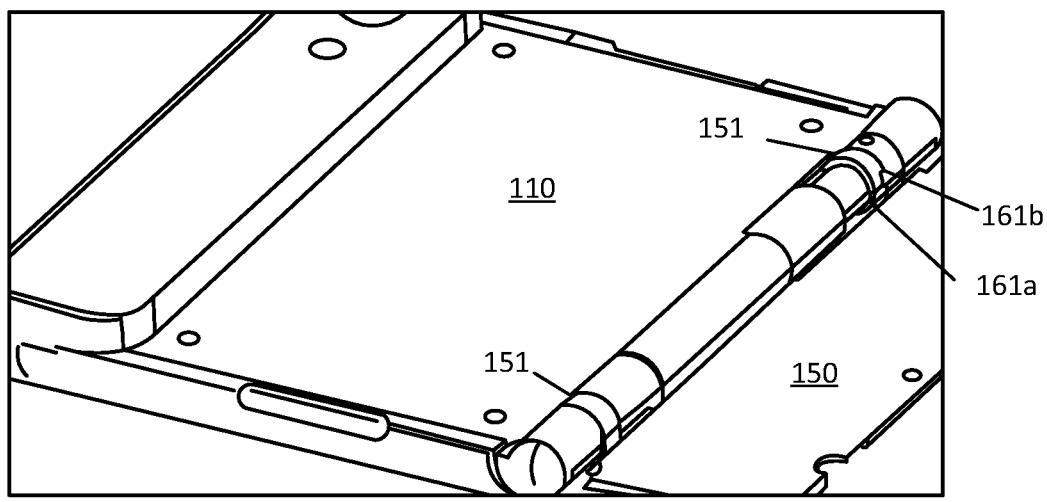
Figure 5L:
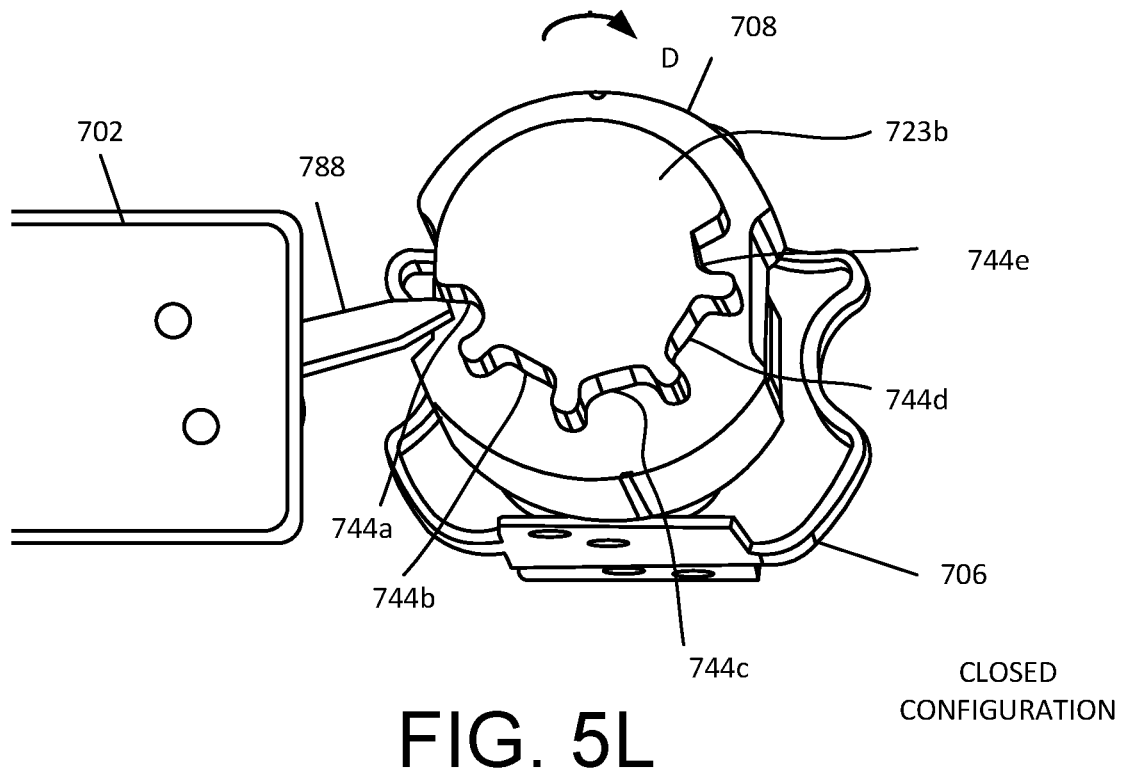
Figure 5M:
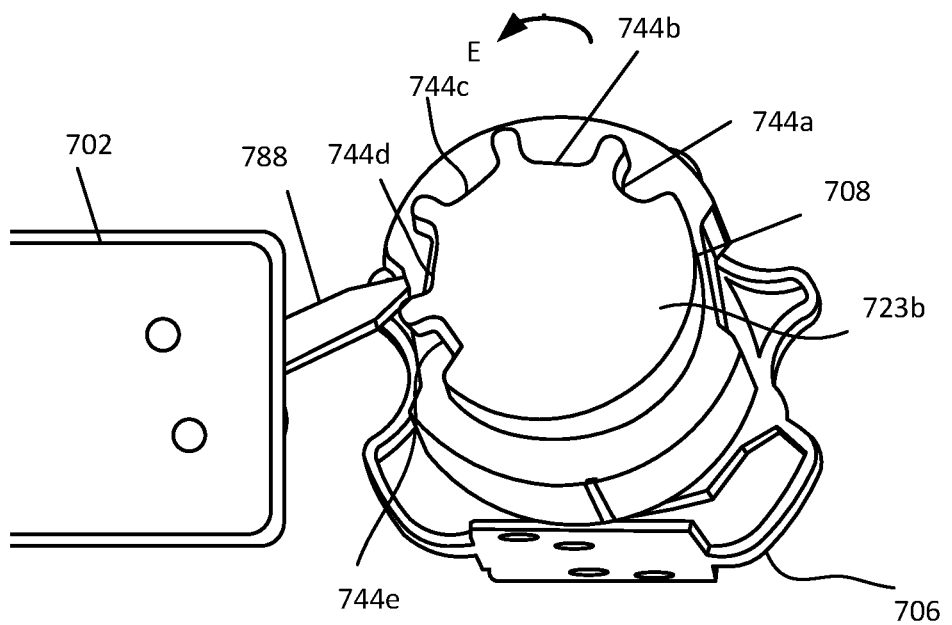

FIGS. 5J and 5K illustrate schematic views of a portion of the hinge assembly 150 (without the second housing 120) according to an example embodiment. FIG. 5J illustrates the display device 10 via the hinge assembly 150 in a closed configuration; and FIG. 5K illustrates the display device 10 via the hinge assembly 150 in an open configuration. FIGS. 5L and 5M illustrate schematic views of the mode detector 700 in a closed configuration and an open configuration, respectively. The mode detector 700 of FIG. 5L corresponds to the configuration of the display device 10 of FIG. 5J, and the mode detector 700 of FIG. 5M corresponds to the configuration of the display device 10 of FIG. 5K.

As shown in FIG. 5L, when the display device 10 is in the closed configuration or when the hinge assembly 150 is in a closed position (FIG. 5J), the needle 788 of the mode detector 704 may be in the notch 744a of the hinge module 708. Hence, the mode detector 704 may transmit a signal to indicate that the first and second housings 110, 120 are in a closed configuration so that the display 100 does not display any visual content or turns off the display.

As shown in FIG. 5M, when the display device 10 is in the open configuration or when the hinge assembly 150 is in an open position (FIG. 5K), the needle 788 of the mode detector 704 may be (approaching) to be in notch 744e of the hinge module 708. In this regard, the hinge module 708 has been rotated in a clockwise direction (as shown by arrow D in FIG. 5L), when comparing the hinge module 708 of FIG. 5L. Hence, the mode detector 500 may transmit a signal to indicate that the first and second housings 110, 120 are in an open configuration, so that the display 100 displays visual content on the entire display area.

In some implementations, the display device 10 may return back to its closed configuration by rotating in a counter-clockwise direction (as shown by arrow E in FIG. 5M).

In other implementations, when the display device 10 is in the tent configuration or when the hinge assembly 150 is at an angle with respect to the first housing 110, the needle 788 of the mode detector 704 may be in either the notch 744b or 744e of the hinge module 708. Hence, the mode detector 704 may transmit a signal to indicate that the first and second housings 110, 120 are at an angle (e.g., 45° or 135°) so that the display 100 displays the visual content on a portion of the display. Hence, the mode detector 500 may transmit a signal to indicate that the first and second housings 110, 120 are facing each other at an angle (e.g., approximately 45° or 135°) so that the display 100 displays visual content a portion of the display 100.

In other implementations, when the display device 10 is in the laptop configuration or when the hinge assembly 150 is at a right angle (e.g., 90°) with respect to the first housing 110, the needle 788 of the mode detector 704 may be in the notch 744c of the hinge module 708. Hence, the mode detector 704 may transmit a signal to indicate that the first and second housings 110, 120 are at a right angle (e.g., 90°) so that the display 100 displays the visual content on a portion of the display. Hence, the mode detector 500 may transmit a signal to indicate that the first and second housings 110, 120 are at a right angle so that the display 100 displays visual content a portion of the display 100.

In addition, exemplary foldable display devices can be transformed into various display devices (e.g., a full-display device or a half-display device). Hence, this can provide a foldable display device that is more versatile and user friendly. For instance, in a full-display device (e.g., open configuration), the flexible display may display a video content (e.g., movie, games, film, etc.) to capture a full screen mode, and in a half-display device (e.g., closed configuration), the flexible display may display a print content (e.g., book, newspaper, article, etc.) to enlarge a size of the print content to fit an entire display area. Similarly, in the tent mode, the flexible display may also use a portion of the display to transform into a half-display device. In this regard, the user in the tent mode can easily operate the display device and can find many advantages and benefits. For instance, the user can view notifications more easily, provide hands-free video chatting while doing other activities, replace or remove current stand device on the mobile terminal (e.g., hands-free viewing), easier to record oneself (e.g., for a video recording), easier to take group photos (e.g., not having to crowd around on one side of the mobile terminal, etc.

Figure 8:
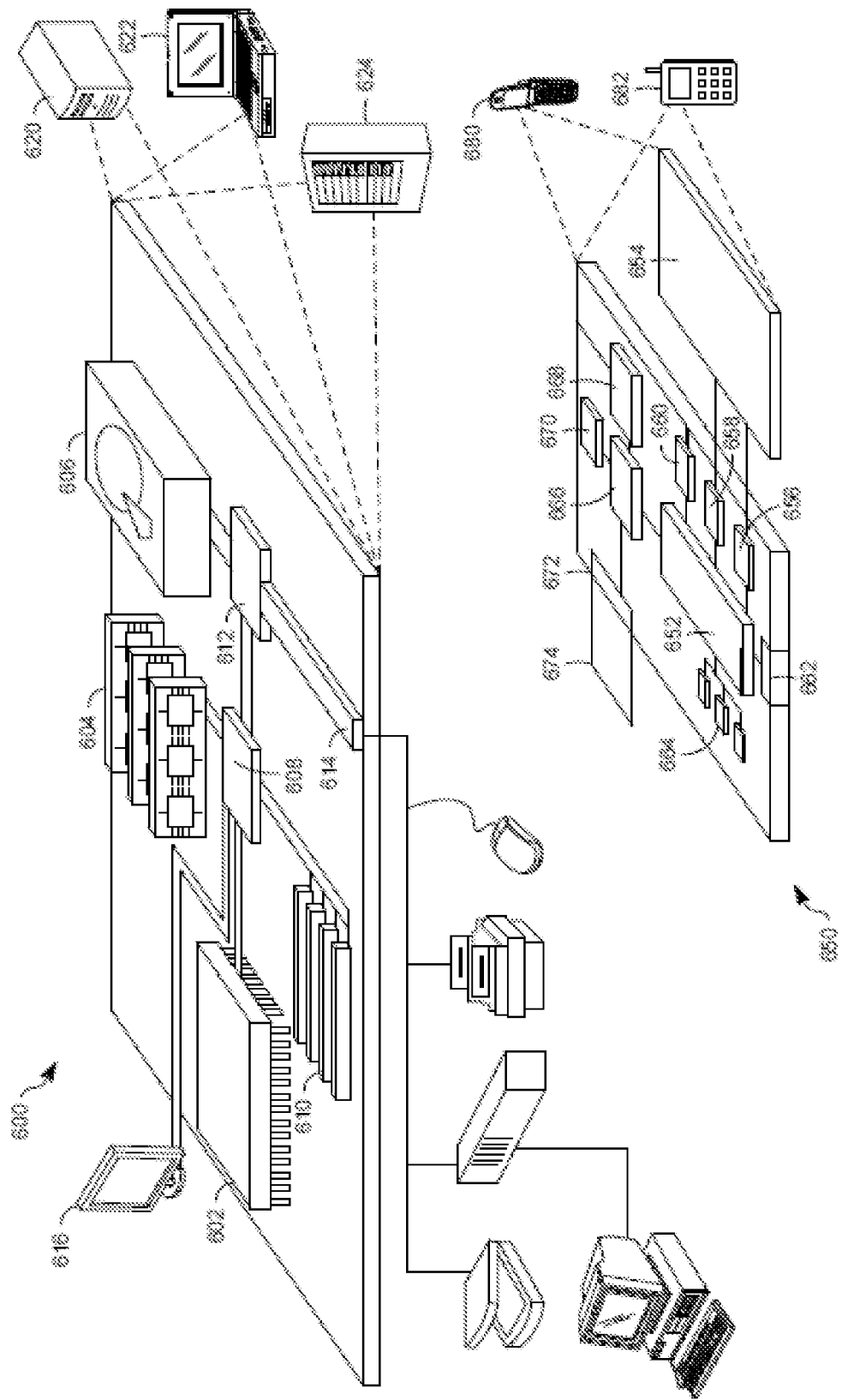
FIG. 8 illustrates an example of a computing device that can be used with circuits described here.

FIG. 8 shows an example of a generic computer device 600, which may be used with the techniques described here. Features described with respect to the computer device 600 may be included in the electronic device 10 described above. Computing device 600 is intended to represent various forms of digital computers, such as, laptops, workstations, personal digital assistants, servers, blade servers, mainframes, and other appropriate computers. Electronic device 650 is intended to represent various forms of mobile devices, such as personal digital assistants, cellular telephones, smart phones, and other similar electronic devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the electronic device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the electronic device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from electronic device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the electronic device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the electronic device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation-and location-related wireless data to device 650, which may be used as appropriate by applications running on device 650.

The computing device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

In some implementations, the array of display pixels may be formed from liquid crystal display (LCD) components, an array of electrophoretic display pixels, an array of plasma display pixels, microelectromechanical (MEMS) shutter pixels, electro-wetting pixels, micro-light-emitting diodes (small crystalline semiconductor die), quantum dot light-emitting diodes, or display pixels based on other display technologies.

In some implementations, a display pixel may include a light-emitting element (not shown), for instance, an organic light-emitting diode (OLED), and pixel circuit. Each display pixel in the display area may be associated with a pixel circuit, which may include at least one switching thin-film transistor (TFT) and at least one driving TFT on the display. Further, each pixel circuit may be electrically connected to a gate line and a data line to communicate with one or more driving circuits, such as a gate driver and a data driver positioned in the non-display area of the display. For example, one or more driving circuits can be implemented with TFTs in the non-display area 101b. There may be any suitable number of rows and columns of pixels in the display (e.g., tens or more, hundreds or more, or thousands or more).

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein may be interpreted accordingly.

Example embodiments of the present inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the present inventive concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which this present inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A foldable electronic device, comprising:
   a processor;
   a memory;
   a first housing including a first hinge portion;
   a second housing;
   a flexible display disposed on the first housing and the second housing;
   a hinge assembly including a second hinge portion rotatably coupled to the first hinge portion of the first housing, wherein the hinge assembly is configured for providing relative rotation of the first housing with respect to the second housing; and
   a mode detector assembly configured to detect configurations of the electronic device and configured to generate a signal indicating a change of mode of operation of the display, the mode detector assembly including at least a flexible connection member and a spring member,
   wherein the spring member is disposed in the first hinge portion of the first housing or in the second hinge portion of the hinge assembly or in the first hinge portion of the first housing and in the second hinge portion of the hinge assembly, and
   wherein a portion of the flexible connection member is disposed in the first hinge portion of the first housing.

2. The electronic device of claim 1, wherein the flexible connection member includes a plurality of contacts that define a spatial relationship between the first housing and the second housing.

3. The electronic device of claim 2, wherein the plurality of contacts are arranged on the flexible connection member in a circular manner.

4. The electronic device of claim 2, wherein the spring member includes a first contact portion and a second contact portion, and wherein the first contact portion and the second contact portion each contact a contact to determine an angle of the first housing in relation to the second housing.

5. The electronic device of claim 4, wherein the first contact portion faces the second contact portion.

6. The electronic device of claim 1, wherein the spring member is configured to rotate with respect to the flexible connection member.

7. The electronic device of claim 1, wherein the mode detector assembly further includes a spring holder, wherein the spring holder is disposed in the second hinge portion of the hinge assembly and rotatably coupled to the spring member.

8. The electronic device of claim 1, wherein the hinge assembly further includes a hinge module, the hinge module being disposed in at least one of the first hinge portion or the second hinge portion.

9. The electronic device of claim 1, wherein the spring member includes a plurality of peak portions and a plurality of valley portions.

10. The electronic device of claim 9, wherein the mode detector assembly further includes a lever member, the lever member being disposed within the spring member and configured to engage a portion of the spring member.

11. The electronic device of claim 9, wherein the lever member includes a cam portion and an elongate portion, the cam portion being configured to engage at least one of the plurality of valley portions of the spring member.

12. The electronic device of claim 11, wherein the elongate portion of the lever member includes an opening configured to engage cooperatively with an opening in a hinge module.

13. The electronic device of claim 1, wherein the flexible connection member includes at least a first bend portion in a first direction and a second bend portion in a second direction, the second direction being different than the first direction.

14. The electronic device of claim 1, wherein the flexible connection member includes a first end portion and a second end portion, the first end portion being connected to the second hinge portion and the second end portion being connected to a printed circuit board.

15. The electronic device of claim 14, wherein the first end portion of the flexible connection member is attached to the first hinge portion of the first housing via adhesive.

16. A foldable electronic device, comprising:
a processor;
a memory;
a first housing including a first hinge portion;
a second housing;
a flexible display disposed on the first housing and the second housing;
a hinge assembly configured to provide relative rotation of the first housing and the second housing, the hinge assembly including a second hinge portion rotatably coupled to the first hinge portion of the first housing; and
a mode detector assembly configured to detect configurations of the electronic device, the mode detector assembly including at least a flexible connection member and a spring member, the flexible connection member including a first contact and a second contact, wherein:
in a first rotational position of the electronic device, the spring member contacts a first contact disposed at a first location of the flexible connection member; and
in a second rotational position of the electronic device, the spring member contacts a second contact disposed at a second location of the flexible connection member, the second location being at a different location than the first location.

17. The electronic device of claim 14, wherein the spring member includes a first contact portion and a second contact portion, the first contact portion and the second contact portion being configured to contact one of the first contact or the second contact of the flexible connection member.

18. A foldable electronic device, comprising:
a processor;
a memory;
a first housing including a first hinge portion;
a second housing;
a flexible display disposed on the first housing and the second housing;
a hinge assembly configured to provide relative rotation of the first housing and the second housing, the hinge assembly including a second hinge portion rotatably coupled to the first hinge portion of the first housing; and
a mode detector assembly configured to detect configurations of the electronic device, the mode detector assembly including at least a mode detector, a flexible connection member, and a spring member, the mode detector including a needle portion, wherein:
in a first rotational position of the electronic device, the needle portion is configured to engage a first notch disposed at a first location of a hinge module; and
in a second rotational position of the electronic device, the needle portion is configured to engage a second notch disposed at a second location of the hinge module, the second notch being at a different location than the first notch.

19. The electronic device of claim 18, wherein the spring member includes a plurality of peak portions and a plurality of valley portions.

20. The electronic device of claim 19, wherein the mode detector assembly further includes a lever member, the lever member includes at least a cam portion, the cam portion being configured to engage at least one of the plurality of valley portions of the spring member.

* * * * *